(12) United States Patent
Vivek et al.

(10) Patent No.: US 12,387,225 B2
(45) Date of Patent: Aug. 12, 2025

(54) DECENTRALIZED IDENTITY METHODS AND SYSTEMS

(71) Applicant: STATE FARM MUTUAL AUTOMOBILE INSURANCE COMPANY, Bloomington, IL (US)

(72) Inventors: Veena Vivek, Chandler, AZ (US); EllaKate LeFebre, Mesa, AZ (US); Stephen Dunstan, Tempe, AZ (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 168 days.

(21) Appl. No.: 18/237,771

(22) Filed: Aug. 24, 2023

(65) Prior Publication Data

US 2024/0089117 A1    Mar. 14, 2024

Related U.S. Application Data

(60) Provisional application No. 63/431,869, filed on Dec. 12, 2022, provisional application No. 63/400,717, filed on Aug. 24, 2022.

(51) Int. Cl.
*G06Q 30/018* (2023.01)
*G06F 16/955* (2019.01)
(Continued)

(52) U.S. Cl.
CPC ....... *G06Q 30/018* (2013.01); *G06F 16/9554* (2019.01); *G06K 7/1417* (2013.01);
(Continued)

(58) Field of Classification Search
CPC ...... G06Q 30/018; G06Q 20/36; G06Q 40/08; G06Q 2220/00; G06F 16/9554;
(Continued)

(56) References Cited

U.S. PATENT DOCUMENTS

2019/0281028 A1* 9/2019 Gillan ................... H04L 9/3271
2019/0305964 A1* 10/2019 Hamel .................. H04L 9/0891
(Continued)

OTHER PUBLICATIONS

ADOT, "What you need to know about the Arizona Mobile ID," Retrieved from the Internet at: https://azdot.gov/motor-vehicles/driver-services/mobile-id (2022).
(Continued)

*Primary Examiner* — John B King
(74) *Attorney, Agent, or Firm* — MARSHALL, GERSTEIN & BORUN LLP

(57) ABSTRACT

The present techniques relate to, inter alia, cryptographically-verifiable insurance credentials and cryptographically-verifiable property transfer. The novel methods and systems of decentralized identity discussed herein improve user experience (whether individual or organizational) by moving control over identity from the hands of centralized entities, back to where it belongs—i.e., to the hands of individual organizations and users. In one aspect, a method includes obtaining a scanned image; processing the scanned image; transmitting a claim request; and receiving and storing an attestation response, and a computing system includes a processor; and a memory having stored thereon computer-executable instructions that, when executed by the one or more processors, cause the computing system to: receive a claim request; cryptographically verify the claim; and transmit an attestation response.

20 Claims, 13 Drawing Sheets

(51) Int. Cl.
  *G06K 7/14* (2006.01)
  *G06Q 20/36* (2012.01)
  *G06Q 40/08* (2012.01)
  *H04L 9/32* (2006.01)
  *G06V 30/19* (2022.01)

(52) U.S. Cl.
  CPC ............. *G06Q 20/36* (2013.01); *G06Q 40/08* (2013.01); *H04L 9/3218* (2013.01); *H04L 9/3234* (2013.01); *H04L 9/3247* (2013.01); *H04L 9/3263* (2013.01); *G06Q 2220/00* (2013.01); *G06V 30/191* (2022.01)

(58) Field of Classification Search
  CPC ....... G06F 21/31; G06F 21/45; G06K 7/1417; H04L 9/3218; H04L 9/3234; H04L 9/3247; H04L 9/3263; H04L 9/3239; H04L 9/50; G06V 30/191; G06V 2201/10; G06V 10/17; G06V 10/235; G06V 20/20; G06V 30/224
  See application file for complete search history.

(56) References Cited

U.S. PATENT DOCUMENTS

| | | | |
|---|---|---|---|
| 2019/0318558 A1* | 10/2019 | Biehlmann | G07C 9/27 |
| 2019/0332774 A1* | 10/2019 | Nix | H04W 12/50 |
| 2020/0226617 A1* | 7/2020 | Meadow | G06K 19/06037 |
| 2020/0304480 A1* | 9/2020 | Buchner | H04L 63/08 |
| 2020/0364187 A1* | 11/2020 | Tran | G06N 3/02 |
| 2021/0049710 A1* | 2/2021 | Haywood | G06Q 30/0204 |
| 2021/0133701 A1* | 5/2021 | Chen | H04L 63/0823 |
| 2021/0392054 A1* | 12/2021 | David | H04L 67/56 |
| 2022/0070668 A1* | 3/2022 | Henot | H04L 63/12 |
| 2022/0116231 A1* | 4/2022 | Choi | G06Q 20/40145 |
| 2022/0173967 A1* | 6/2022 | Ameling | G06V 10/00 |
| 2022/0374872 A1* | 11/2022 | Mohanna | G06Q 20/3674 |
| 2023/0177487 A1* | 6/2023 | Murdoch | G06F 21/33 705/44 |
| 2023/0259918 A1* | 8/2023 | Rao | G06Q 20/4014 705/67 |
| 2023/0259922 A1* | 8/2023 | Rao | H04L 9/3213 |
| 2024/0095838 A1* | 3/2024 | Vivek | H04L 9/3218 |
| 2024/0211709 A1* | 6/2024 | Jarde | H04W 12/06 |
| 2024/0320376 A1* | 9/2024 | Zeng | G06Q 30/018 |
| 2024/0372855 A1* | 11/2024 | Gunther | G06K 19/06037 |

OTHER PUBLICATIONS

W3C, "Decentralized Identifiers (DIDs) v1.0", Retrieved from the Internet at: https://www.w3.org/TR/did-core/ (Jul. 19, 2022).

\* cited by examiner

FIG. 4C

DECENTRALIZED IDENTITY METHODS AND SYSTEMS

CROSS-REFERENCE TO RELATED APPLICATIONS

The present application claims priority to U.S. Provisional Application No. 63/431,869, entitled DECENTRALIZED IDENTITY METHODS AND SYSTEMS, filed Dec. 12, 2022, and U.S. Provisional Application No. 63/400,717, entitled DECENTRALIZED IDENTITY METHODS AND SYSTEMS FOR CRYPTOGRAPHICALLY-VERIFIABLE PROPERTY TRANSFER, filed Aug. 24, 2022, the entire contents of which are incorporated herein by reference in its entirety.

TECHNICAL FIELD

The present disclosure is generally directed to methods and systems for decentralized identity methods and systems and, more particularly, to techniques for cryptographically-verifiable insurance credentials and cryptographically-verifiable property transfer.

BACKGROUND

Conventionally, individuals and organizations have used identifiers for many purposes. For example, when an individual—call her Jane—desires to start a new business website (e.g., JanesBakery.com), she may start a website and serve it via HTTP. However, most web browsers are configured to display various warnings and errors to users visiting HTTP-only websites (i.e., sites that lack cryptographic identification). In some cases, modern web browsers refuse altogether access to sites like Jane's. Jane's only recourse has been to obtain a cryptographically-signed digital certificate from a third party certificate authority (CA), certifying that JanesBakery.com belongs to a particular website (e.g., IP address) under Jane's control.

Once obtained, HTTPS (i.e., secure HTTP) transparently negotiates the cryptographic authenticity of https://janesbakery.com using the certificate for all web visitors. In general, HTTPS may be the means by which a person visiting a website knows that they are, in fact, visiting the desired web page, and not the website of a malicious actor. This is of course important for many reasons, especially when there is any exchange of private information. In the same way, the holographic watermark of a person's driver's license, or the blue check next to their Twitter handle, may be an indication, issued by a central authority—the Department of Motor Vehicles and Twitter, respectively—of the authenticity of the identity of the bearer.

However, there are drawbacks to these pervasive centralized systems of identity. In Jane's case, the CA may be a centralized third party verifier that intermediates trust between a website such as JanesBakery.com and an individual visitor (e.g., one of Jane's customers). Jane may have no control over whether to use the CA, and individuals visiting Jane's website may have no control over whether the centralized CA is involved in the transaction. Jane's only choice in the matter may be to choose from among a pool of CAs, all of which may be centralized to the same practical extent. If the centralized CA Jane selects is ever compromised, Jane and/or her visitors may be harmed, for example by having their private information leaked or stolen.

There are numerous other examples of adhesive centralized figures that individuals may have to contend with to obtain and verify various forms of identification required to get along in today's world. As mentioned, there are the several motor vehicle authorities the United States and Territories, each of which issue unique driver's licenses. Other examples include the phone companies that issue unique telephone numbers to subscribers. As noted, there are social media companies (e.g., LinkedIn, Twitter and Facebook, to name a few) that issue unique usernames to their users. There are freemium email services (e.g., Gmail, Yahoo! Mail, etc.) that issue unique email addresses to users. Government agencies like the Internal Revenue Service (IRS) issue Taxpayer Identification Numbers (TINs) and Employer Identification Numbers (EINs) that uniquely identify businesses, whether sole practitioners or large entities with hundreds or thousands or more employees. Until recently, the IRS required taxpayers to submit biometric data to a third-party facial recognition provider in order to authenticate their identity, until it was discontinued due to privacy concerns. The list of attempts, both successful and less so, to centralize identity management goes on and on, and applies to products (e.g., serial numbers) as well as to individual people and organizations.

The link (and flaw) connecting each of the aforementioned examples may be that conventionally, global identifiers such as cryptographic certificates, email addresses, etc. are maintained, signed and issued by centralized authorities whose practices are completely outside of the control of the user or organization being identified. Unfortunately, individuals and organizations alike often understand control of their identities to be, ultimately, the prerogative of entrenched, centralized actors who may be, at best, neutral regarding the best interest of the individual or organization. Whether those parties are corporate or government actors, this lack of control may cause the individual or organization to feel powerless and depersonalized. The requirement to curate and maintain this data may be, further, a liability for the centralized party. Lack of control over one's identity may result in other problems, when for example a centralized actor acts takes action against—or fails to act in favor of—an individual or organization, whether that is due to negligence, error, business discontinuity, censorship or for other reasons. In sum, there is a growing recognition that the reasons to exercise control over one's own identity are many, and the reasons to surrender that control are few.

Across the Internet, work is underway to decentralize existing centralized identification paradigms, for example as reflected by the W3C's Decentralized Identifiers (DIDs) recommendation, available at https://www.w3.org/TR/did-core, incorporated herein by reference in its entirety, for all purposes. However, conventional user interfaces and design/flow patterns may be inadequate and incompatible with that future. Conventional techniques may also be ineffective, cumbersome, or inefficient, and have additional drawbacks as well.

BRIEF SUMMARY

The present aspects may relate to, inter alia, to techniques for cryptographically-verifiable insurance credentials and cryptographically-verifiable property transfer. The novel methods and systems of decentralized identity discussed herein improve user experience (whether individual or organizational) by moving control over identity from the hands of centralized entities, back to where it belongs—i.e., to the hands of individual organizations and users.

In one aspect, a computer-implemented method for obtaining a cryptographically-signed credential may be provided. The method may be implemented via one or more local or remote processors, transceivers, sensors, servers, memory units, mobile devices, wearables, virtual reality headsets, augmented reality or smart glasses, and/or other electronic or electric components. In one instance, the method may include (such as via one or more processors and associated transceivers) (i) obtaining, in response to a user scan action with respect to a graphical user interface scan element displayed on a mobile computing device, via a camera device of the mobile computing device, a scanned image of a quick response code; (ii) processing the scanned image of the quick response code to extract code information including a uniform resource identifier to establish a decentralized identifier (DID) protocol; (iii) transmitting a DID communication request to a software agent of an issuing party according to the DID protocol, the DID communication request including at least a cryptographic key of the user and security data; (iv) receiving an attestation response from the software agent including at least the cryptographically-signed credential; and/or (v) storing, in response to a user accept action with respect to a graphical user interface accept element displayed on the mobile computing device, the cryptographically-signed credential in an electronic database of a digital wallet application in a memory of the mobile computing device. The process may include additional, less, or alternate functionality, including that discussed elsewhere herein.

In another aspect, a computing system for obtaining a cryptographically-signed credential may be provided. The system may include one or more local or remote processors, transceivers, sensors, servers, memory units, mobile devices, wearables, virtual reality headsets, augmented reality or smart glasses, and/or other electronic or electric components. In one instance, the system may include one or more processors; and one or more memories having stored thereon computer-executable instructions that, when executed by the one or more processors, cause the computing system to: (i) receive a decentralized identifier (DID) request according to a DID protocol from a mobile computing device, the claim request including at least a cryptographic key of a user and security data; (ii) verify the DID communication request based upon the cryptographic key and security data; and/or (iii) transmit an attestation response corresponding to the claim to the mobile computing device. The computing system may include additional, less, or alternate actions, including those discussed elsewhere herein.

In yet another aspect, a non-transitory computer-readable medium may be provided, having stored thereon computer-executable instructions, that when executed, may cause a computer to: (i) receive a claim request via a uniform resource identifier from a mobile computing device, the claim request including at least a cryptographic key of a user and security data; (ii) verify the claim based upon the cryptographic key and security data; and/or (iii) transmit an attestation response corresponding to the claim to the mobile computing device. The computer-readable medium may include instructions that direct additional, less, or alternate functionality, including that discussed elsewhere herein.

BRIEF DESCRIPTION OF THE FIGURES

The figures described below depict various aspects of the system and methods disclosed therein. It should be understood that each figure depicts one aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

FIG. 4C depicts an example of an automatically completed DID checkout GUI, according to some aspects.

Figure 1:
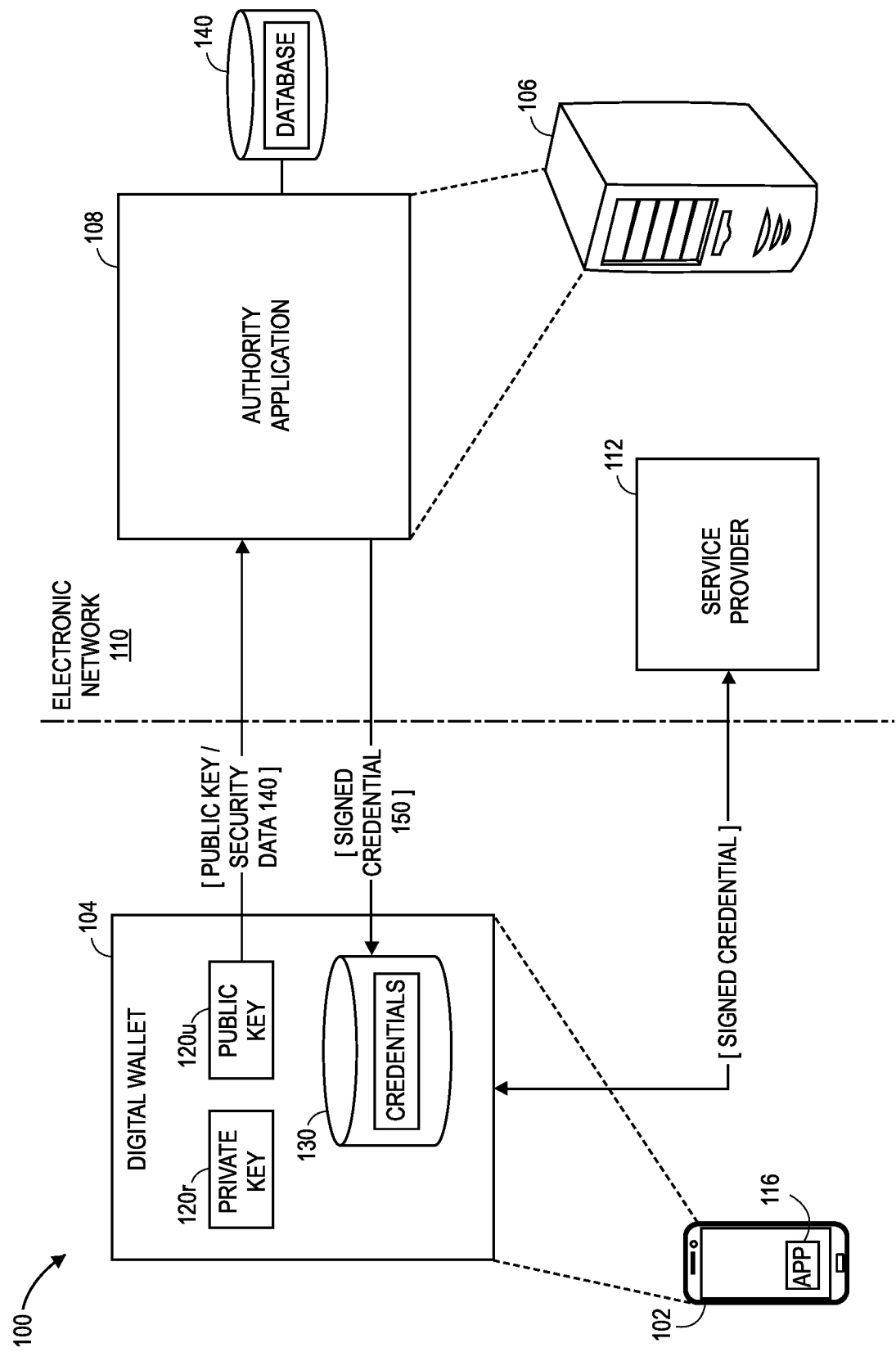
FIG. 1 depicts an exemplary computing environment 100 in which a user may make an identity claim request including claim proof and receive in response an attestation that the claim is true, according to some aspects.

The figures depict preferred aspects for purposes of illustration only. One skilled in the art will readily recognize from the following discussion that alternative aspects of the systems and methods illustrated herein may be employed without departing from the principles of the invention described herein.

DETAILED DESCRIPTION

Overview

The aspects described herein relate to, inter alia, methods and systems for decentralized identity methods and systems, and more particularly, to techniques for cryptographically-verifiable insurance credentials and to techniques cryptographically-verifiable property transfer. Decentralization of identity verification is desirable for a number of reasons. As discussed above, a cryptographic authority (e.g., a CA, a state government, etc.) often represents a single point of failure in a cryptographic ecosystem. A compromised CA poses one set of problems, wherein falsified certificates may be used to execute a man-in-the-middle attack. A stolen password to a Twitter handle might not seem like a major problem, but if that handle is an important or highly visible one (e.g., @POTUS) it is not difficult to imagine the type of harm that could be the result. Therefore, there is an aspect of centralized identity verification and control that may result in less secure computing systems.

Less dramatically, but still of great interest, is the desire to ensure that insurance cards and other forms of identification used in commercial transactions are authentic and verified. For example, there is an undeniable benefit that results from ensuring that a person renting a vehicle possesses both a valid driver's license and adequate vehicle insurance in good standing, in some aspects subject to the jurisdiction in which the rental occurs. The examples provided herein are for expository purposes, and those of ordinary skill in the art will readily appreciate that many additional applications of the present techniques are envisioned. The move from centralized to decentralized identities, wherein users/organizations—instead of central authorities—are responsible for providing their identity data is sometimes referred to as the concept of "self-sovereign identity."

Decentralized identification and self-sovereign identity may be implemented using a number of alternative technical architectures, as discussed herein. However, for example, as shown in the W3C's DIDs recommendation, a decentralized identifier may be analogous to an HTTP uniform resource identifier (URI) insofar as that it is a human-readable string comprising a scheme, a method and a method-specific identifier:

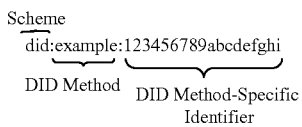

The above example DID string may resolve to an example DID document having the following definition:

```
{
  "@context": [
    "https://www.w3.org/ns/did/v1",
    "https://w3id.org/security/suites/ed25519-2020/v1"
  ],
  "id": "did:example:123456789abcdefghi",
  "authentication": [{
    "id": "did:example:123456789abcdefghi#keys-1",
    "type": "Ed25519VerificationKey2020",
    "controller": "did:example:123456789abcdefghi",
    "publicKeyMultibase":
      "zH3C2AVvLMv6gmMNam3uVAjZpfkcJCwDwnZn6z3wXmqPV"
  }]
}
```

The above example DID string may be under the control of a user or organization, and independent from any centralized authority, database or registry.

Symmetric and Asymmetric Cryptography

Some of the conventional centralized systems discussed above rely on symmetric key cryptography, a form of cryptography in which a single secret key is used for encryption and decryption operations (e.g., a single key used both to encrypt plaintext into ciphertext, and to decrypt ciphertext back into text). In other words, when Alice wants to share a secret with Bob, Alice encrypts the message using key K, and Bob decrypts the message using key K (or a transformation thereof). That both Alice and Bob hold the key K is a facet of symmetric key cryptography that often leads to centralization—in other words, because the encryption key is shared, there is a natural mutual expectation that leads an individual or organization to feel compelled to hand over control of private data to another party.

On the other hand, in asymmetric key cryptography, a pair of keys is used. First, a public key, that is intended to be shared, and second, a private key that is intended to remain private. For example, when Alice wants to share a message with Bob, Alice uses Bob's public key to encrypt the message, such that only Bob's private key can decrypt it. Similarly, Alice may sign the message using her keys to authenticate the message (i.e., to prove that it originated from Alice and not another party).

Exemplary Computing Environment

Turning to identity verification, FIG. 1 depicts an exemplary computing environment 100 in which a user may make an identity claim request including claim proof and receive in response an attestation that the claim is true, according to some aspects. The computing environment 100 includes a mobile device 102 including a digital wallet 104 and a remote computing device 106 including an authority application 108. Generally, the mobile device 102 and the remote computing device 106 may be communicatively coupled via an electronic network layer 110, that may include one or more intermediate networks (e.g., one or more routers, switches, Wi-Fi devices, virtual private networks, public networks, the Internet, etc.). In some aspects, the mobile device 102 may be communicatively coupled to a remote service provider 112.

In some aspects, the mobile device 102 may be any type of suitable computing device (e.g., a mobile phone, a laptop, a desktop, a server, a wearable device, virtual headset, smart glasses, augmented reality glasses, virtual or extended reality headset, smart watch, etc.). In some aspects, the mobile computing device 102 and the remote computing device 106 may reside on the same network, or may be the same device. The remote computing device 106 may be any type of suitable computing device (e.g., a mobile phone, a laptop, a desktop, a server, a wearable device, etc., in certain aspects. The remote computing device 106 may comprise or compose one or more suitable computing devices, such as a cluster, public or private cloud computing environment, etc.

The digital wallet 104 may correspond to computer-executable instructions stored in a non-transitory memory (e.g., a hard drive, random access memory, magnetic drive, solid state disk, etc.) of the mobile device 102. For example, the mobile device 102 may include a mobile application 116 that includes computer-executable instructions (e.g., an Android Package (i.e., .apk), Apple iOS application, etc.). The digital wallet 104 may be caused to perform various functions by one or more processors (e.g., central processing units, graphics processing units, etc.) included in the mobile device 102 that execute the computer-executable instructions. The digital wallet 104 may be a digital wallet of an individual and/or another entity (e.g., an organization, a government body, etc.). The digital wallet 104 may include a private key 120r and a public key 120u. The private key 120r may be a secret key that the user or organization creates, which corresponds to the public key 120u, wherein the public key 120u is for public dissemination and the private key 120r is held strictly in confidence—i.e., is accessible only by the owner/controller of the wallet 104. In this way, the user or organization that controls the wallet 104 exercises self-sovereignty of their identity, because they are exercising control over authentication and encryption of their private information, as discussed above, rather than relying on a third party to control their private keys (e.g., as would be the case if the private key was stored by a third party and/or if symmetric key encryption was used).

In some aspects, the digital wallet 104 may store a plurality of public/private key pairs 120r/120u, corresponding to multiple respective identities. In this way, for example, an organization's wallet may include an identity for each employee, or for each public-facing application programming interface (API), artificial intelligence (AI) entity or other construction (i.e., an identity represented in the digital wallet 104 need not necessarily correspond to a human actor). The digital wallet 104 may thus operate as a user agent on the mobile device 102 that is configured to obtain, store, and utilize decentralized identifiers (DIDs) according to one or more DID communication protocols, such as by communication with software agents of credential issuers or by providing or displaying stored credentials for later identity verification. The use of a plurality of public/private key pairs 120*r*/120*u* gives an organization and/or individual user great flexibility in establishing and using multiple identities in a decentralized manner. In certain aspects, this may also enable the user to store multiple identities (e.g., a true identity, and one or more pseudonymous or anonymous identities).

The digital wallet 104 may further include one or more credentials database 130 issued by the authority application 108 and/or by other authorities. The credentials database 130 may be an electronic database (e.g., an SQL, NoSQL database, key-value store, cloud computing database, etc.). Generally, a credential in the credentials database 130 may include machine-readable data cryptographically signed by an authority (e.g., the authority application 108), the signature of which demonstrates the authenticity of the signed credential, as discussed further below. The credential in the credentials database 130 may be cryptographically signed and/or cryptographically encrypted by both the private key 120*r* and public key 120*u* of the digital wallet 104 and/or by one or more public/private keys of the authority application 108.

The digital wallet 104 may include computer-executable instructions that, when executed by the processor of the mobile computing device 102, cause the digital wallet 104 to establish a DID communication protocol for communication with a software agent of a credential issuer and send a claim request 140 to the software agent, such as a DID communication request. The digital wallet 104 may be included in the application 116 or as a separate application (i.e., as a second standalone mobile application). In some aspects, the claim request 140 may include the public key 120*u* of the digital wallet and/or additional security data (e.g., a session cookie). The digital wallet 104 may issue the claim request in response to an action of the user, such as scanning a code, pressing a button on a touch screen of the mobile computing device 102, etc. The wallet 104 may determine a location (e.g., a particular API endpoint or uniform resource identifier (URI)) to send the request to by decoding/extracting information encoded in the scanned code, in some aspects. For example, the scanned code may encode an API endpoint/URI of the authority application 108. The authority application 108 may issue an attestation response 150 in response to the claim request 140.

In general, the authority application 108 may be operated by or on behalf of a party that seeks to provide verification (e.g., to the owner/operator of the digital wallet 104, such as an individual or corporation). For example, the authority application 108 may be implemented as a software agent running in a cloud environment to provide credentials to user agents (e.g., digital wallets 104). In some aspects, the authority application 108 may be used to provide self-authentication, such as when a user authenticates his or her own identity. The authority application 108 may be coupled to a database 140 that may include authority data. For example, when the authority is an insurer, the authority data in the database 140 may include information regarding customer insurance policies and/or other insurance-related data. The authority application 108 may correspond to computer-executable instructions stored in a memory of the remote computing device 106. One or more processors of the remote computing device 106 may execute the computer-executable instructions to cause the authority application 108 to perform various functions, such as processing claim requests (e.g., DID communication requests) received from the digital wallet 104, and generating and transmitting attestation responses to the digital wallet 104.

Once the mobile device 102 of the user has received and stored one or more credentials in the credentials database 130, the user may initiate one or more verification requests to the remote service provider 112. The owner/controller of the remote service provider 112 may not be affiliated with the owner/controller of the authority application 108, in some aspects. The provision of credentials from the mobile device 102 to the service provider 112 advantageously enables the user to prove a claim (e.g., the user's identity) using a stored signed credential.

In operation, the owner/controller of the wallet 104 (herein referred to as the user of the wallet) may want to obtain an attestation. There are many examples of attestations that the user may desire to have, and attestations may have order of operations (i.e., such that they build upon one another, or are related in terms of dependency). For example, the user may want to acquire an attestation that the user is of legal age to drink alcohol. In that case, user may first need to obtain an attestation as to the user's legal name/identity from a state authority. Such attestation may require the user to submit security data including, for example, a birth certificate or other private information, in order to associate the user's public key with the user's identity. The user may use the wallet 104 to submit a claim request 140 including a description of the attestation desired (e.g., legal-name), the user's stored public key 120*u* and/or other security data to the authority application 108.

In response to receiving the claim request 140, the authority application 108 may process the public key and/or other security data (e.g., by cross-referencing the birth certificate to information contained in the database 140) and respond to the user's digital wallet 104 using a signed credential 150, representing an attestation that the user is, in fact, the person identified on the birth certificate. The wallet 104 may then store the signed credential 150 in the credentials database 130. Other qualifications (e.g., a valid-drivers-license attestation) may be subsequently requested via claim requests and, if verified by the authority application 108, issued as a separate signed credential/attestation. For example, the State of Arizona Mobile ID credential may be requested for and obtained, in some aspects. The wallet 104 may prompt the user to store the attestation (e.g., a signed credential) in the credentials database 130. Because the credential is signed, it is a self-authenticating credential that a third party can verify by comparing a credential signature to one of the authority application 108 (e.g., using the public key of the authority application 108). The user may then present the signed credentials to other parties (e.g., to the remote service provider 112).

Digital Insurance Card Aspects

In one aspect, the user of the individual wallet 104 is that of an insurance customer, such as a holder of an auto policy, a life insurance policy, a homeowner's insurance policy, a flood insurance policy, a fire insurance policy or other another type of insurance policy. In some aspects, the user is a business owner whose business is insured under such a policy, an insurance agent, an additional insured, an insurance beneficiary, an underwriter or another functionary in the insurance industry.

The user may seek to obtain, for example, a proof-of-insurance attestation in the form of a signed credential with respect to an automobile insurance policy. To do so, the user may first need to authenticate with a web site, such as the insurer's web site, to obtain a cookie, session or other authentication data. That authentication data may be stored in the user's web browser or mobile application, for example (e.g., in the memory of the mobile computing device 102). The authentication data may be provided by the digital wallet as security data 140, along with the user's public key information. In this way, when the user submits a claim request to the authority application 108, the user provides both information that is self-sovereign (i.e., the public key), as well as information that the insurer may use to verify that the user has a valid account/login credential as a customer of the insurer.

Exemplary Proof-of-Insurance Credential Scanning Aspect

Figure 2:
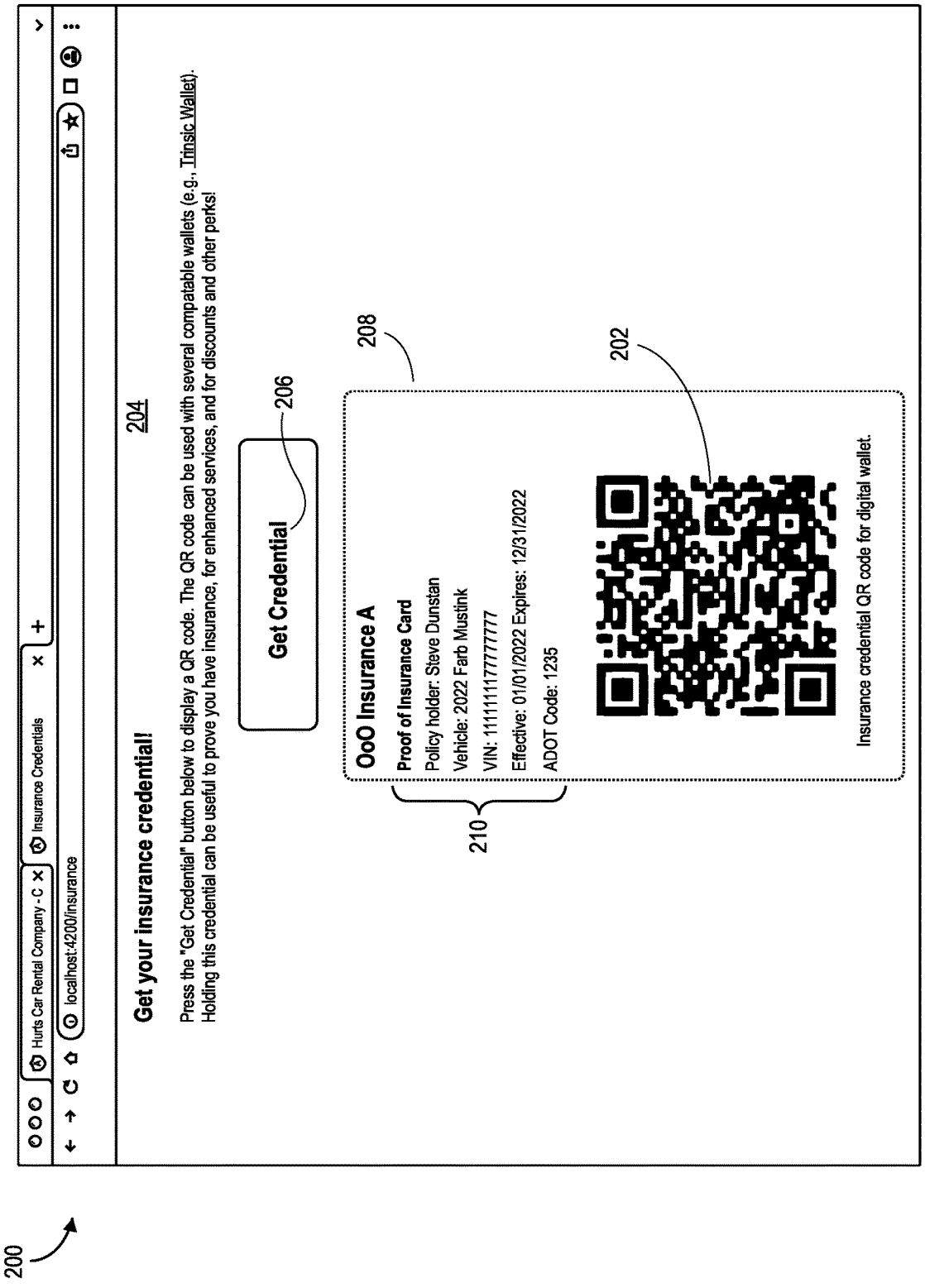
FIG. 2 depicts an exemplary graphical user interface (GUI) for obtaining a digital proof-of-insurance credential, the graphical user interface including a quick response (QR) code, according to some aspects.

FIG. 2 depicts an exemplary GUI 200 for obtaining a digital proof-of-insurance credential, the GUI 200 including a QR code 202, according to some aspects. The QR code 202 may be displayed within a webpage 204 in response to the user interacting with a user interface element 206. Computer-executable instructions that are part of the GUI (e.g., JavaScript code) may cause a menu 208 that includes the QR code 202 and proof of insurance description information 210 to be displayed on the GUI 200. In some aspects, the QR code 202 may be another type of identifying code, such as a bar code, data matrix code, or any other now known or later developed machine-readable code.

For example, the GUI 200 may be displayed in a web browser of a user, such as an insurance customer (e.g., in the mobile device 102 or via another device, such as a laptop or desktop computer). In some aspects, the QR code 202 may be displayed on a web portal of an insurance company, such as the "My Accounts" page available at https://apps.statefarm.com. The user may login to the My Accounts section of the website, and access the user interface element 206 to cause a respective QR code to be displayed for any of a number of vehicles or other covered items. The user may also choose to receive a proof of insurance card as a PDF document or via U.S. Mail Delivery (within 7-10 business days) as less expedient and less self-sovereign means.

In vehicle insurance aspects, the proof of insurance description information 210 may include a policy holder name, a vehicle description, a vehicle identification number (VIN), an insurance effective date, an insurance expiration date a state department of transportation identifier or other applicable information. Of course, as will be appreciated by those of ordinary skill in the art, the scope and content of the information displayed in the proof of insurance information 210 may differ, in certain aspects. For example, in a home insurance context, the proof of insurance information 210 may include a link to or copy of the insurance policy, a declaration page, a property address, lender information, specific coverage limits for structural and liability protection, agent information, etc. Some of this information is not exclusive to homeowners' policies, and may be included in other aspects, including the aforementioned vehicle insurance aspect.

Once the user visits the webpage 204, and the QR code 202 is displayed on the GUI 200, the user may use a camera device or other component of a mobile device (e.g., the mobile device 102 of FIG. 1) to scan the QR code 202. The scanning may be performed by the digital wallet 104 of FIG. 1 and/or by another application (e.g., a camera application of the mobile device 102, the application 116, etc.) as shown in FIG. 3. In general, the application 116 may display multiple GUIs on the mobile device 102, each having respective functionality, as discussed below.

Figure 3A:
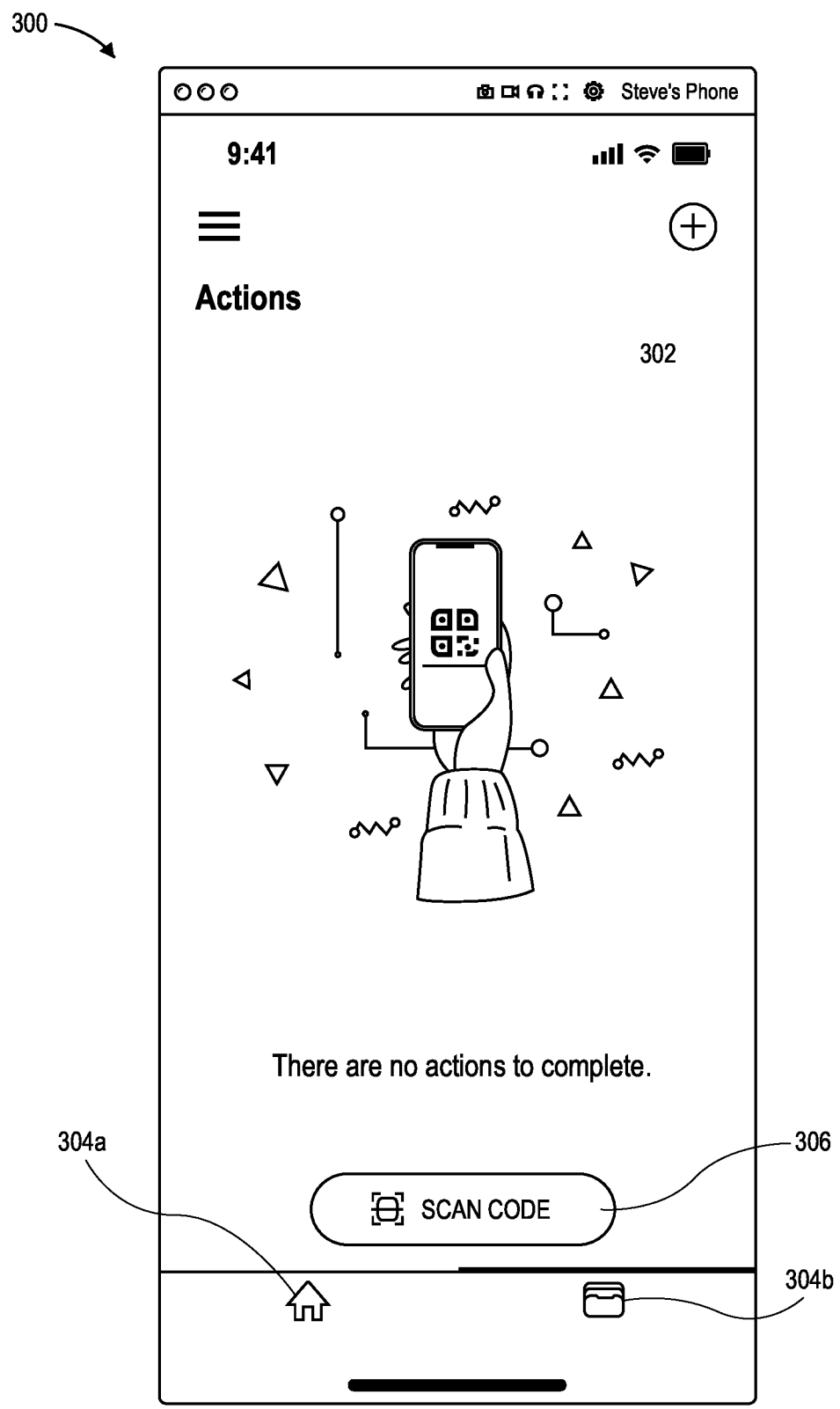
FIG. 3A depicts an exemplary scanner GUI for scanning a QR code, according to some aspects.

FIG. 3A depicts an exemplary scanner GUI 300 for scanning the QR code 202 of FIG. 2, according to some aspects. In FIG. 3, the scanner GUI 300 may be an application that wraps and contains the digital wallet 104, in some aspects. Specifically, the GUI 300 may include an application home screen 302a displayed when a home button 304a is selected, and a wallet screen that is shown when a wallet button 304b is selected. As discussed above, the GUI 300 may include a scan element 306 with which the user may interact (e.g., by clicking, dragging, tapping, touching, etc.) to cause the camera or other component of a mobile device (e.g., the mobile device 102) to scan a QR code (e.g., the QR code 202 of FIG. 2).

In response to the user scanning a QR code using the scan element 306, the scanner GUI 300 may actuate a camera of a mobile device (e.g., the mobile device 102) to read a QR code using a QR code scanning/reading library (e.g., a Python library). For example, the QR code may be one displayed on a computer screen (e.g., the QR code 202 of FIG. 2) or one printed on paper with an adhesive backing, for example. The GUI 300 may process information contained/encoded within the scanned QR code. For example, the processing may include extracting information such as the proof of insurance information 210 from the QR code, in some aspects. In some aspects, the processing may include receiving and/or processing a QR code credential offer, as depicted in FIG. 3B.

Exemplary Attestation/Credential Offer Processing Aspect

Figure 3B:
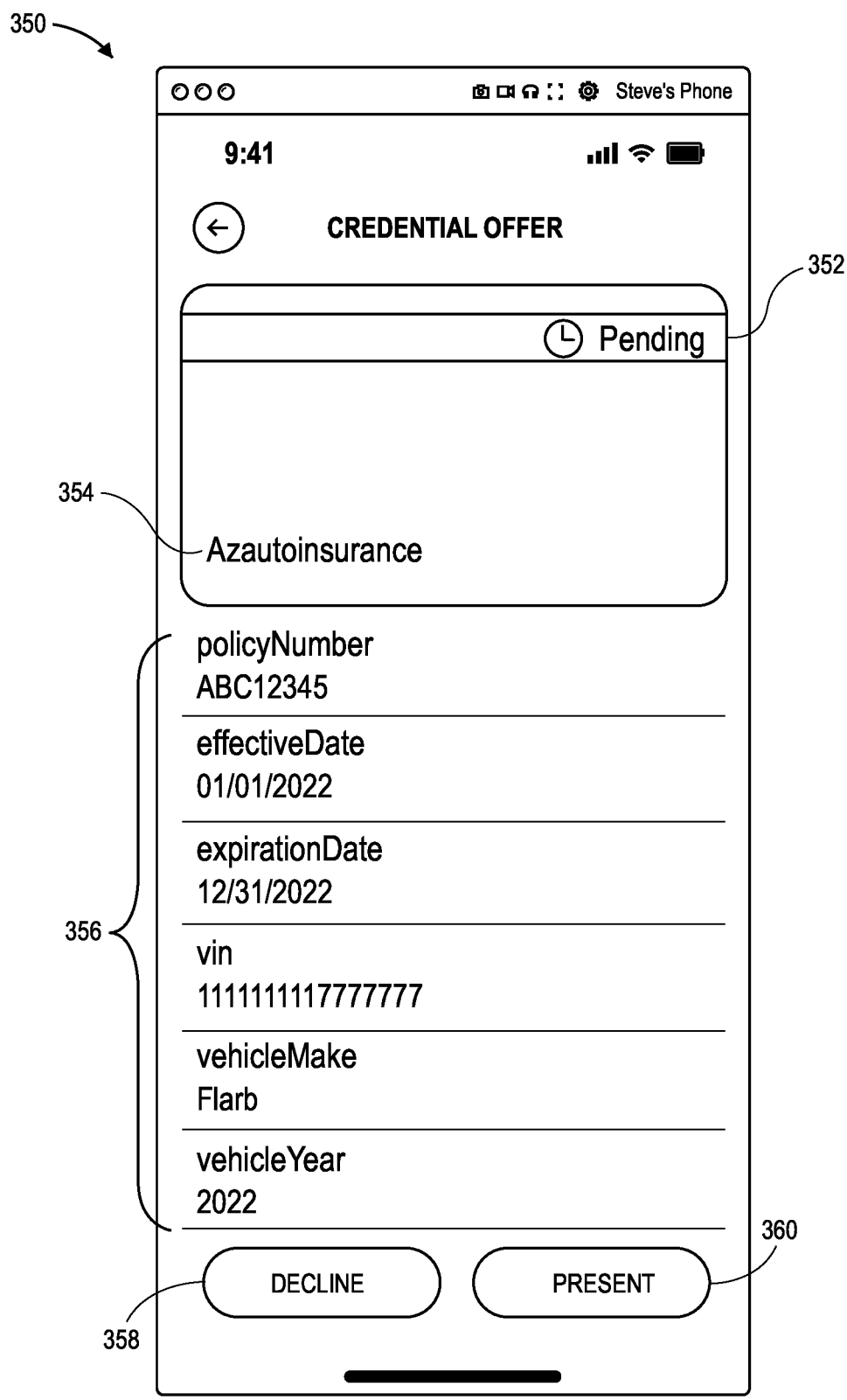
FIG. 3B depicts an exemplary credential offer GUI for accepting and/or rejecting credential offers, according to some aspects.

FIG. 3B depicts an exemplary credential offer GUI 350 for accepting and/or rejecting credential offers, according to some aspects. The credential offer GUI 350 may be displayed by the mobile application 116 in response to the QR code scanning discussed above with respect to FIG. 3A, in some aspects.

For example, when the user scans a QR code, processing instructions included in the mobile application 116 may cause a public key associated with the user (e.g., the public key 120u) to be transmitted via the electronic network 110 to the authority application 108, as part of a claim request 140, as discussed above. The authority application 108 may process the claim request 140 and determine that the request is valid, due to the presence of an existing insurance customer and public key in a known file format (e.g., a binary distinguished encoding rules (DER) format, XML format, base64 format, etc.).

In response to determining that a valid claim request 140 has been received, the authority application 108 may cause to be generated a signed credential 150. The authority application 108 may further cause the generated signed credential 150 to be transmitted via the electronic network 110 to the digital wallet 104. When the digital wallet 104 receives the signed credential 150, the signed credential may cause the credential offer GUI 350 to be displayed, enabling the user to choose whether or not to accept an attestation/credential offer from an authority.

In some aspects, the credential offer GUI 350 may include an insurance card element 352 having an insurer label 354. In vehicle insurance aspects, the credential offer GUI 350 may include vehicle insurance information 356 including one or more of the following: (i) a policy number; (ii) a policy effective date; (iii) a policy expiration date; (iv) a VIN; (v) a vehicle make; (vi) a vehicle model year; etc. More or less information may be displayed, in certain aspects. In homeowners' insurance aspects, home insurance policy information may be displayed in place of the vehicle insurance information 356, such as the information that would ordinarily be found on a homeowners' insurance declaration page, property address, lender information, coverage limits, agent in charge information, etc.

The credential offer GUI 350 may further include a decline element 358 and an accept element 360 that the user may choose from to, respectively, decline or accept to receive a credential offer after having reviewed the credential offer information contained in the insurance card element 352, the vehicle insurance information 356, etc. The credential offer GUI 350 may include instructions that cause information included in the credential offer (i.e., the signed credential 150 of FIG. 1) to be stored in the credentials database 130 of the user's digital wallet 104, in response to the user selecting the accept element 360.

Figure 3C:
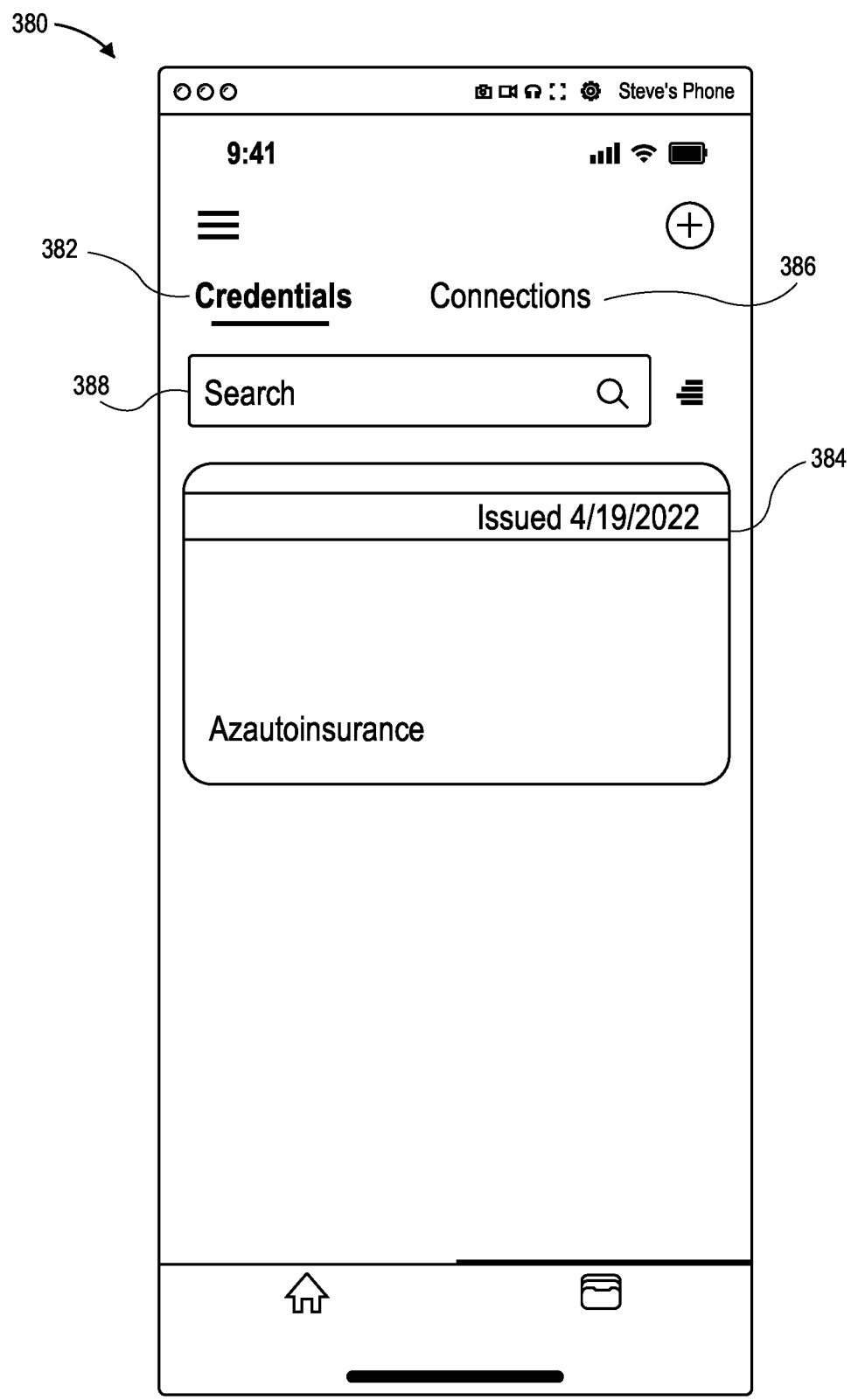
FIG. 3C depicts an exemplary credential management GUI, according to some aspects.

After the user has selected the accept element 360 and the signed credential has been stored in the user's digital wallet, the user may view the stored credential using the application 116, as shown in FIG. 3C.

FIG. 3C depicts an exemplary credential management GUI 380, according to some aspects. The credential management GUI 380 includes a list of credentials 382 including one or more credentials 384, a list of connections 386 and a search element 388. The one or more credentials 384 correspond to the credential accepted by the user as depicted in FIG. 3B in response to the code scanning depicted in FIG. 3A, in some aspects. The search element 388 enables the user to search their credentials (e.g., the credentials stored in the credentials database 130 of FIG. 1). The connections 386 may store other authentication information of the user (e.g., OAuth access tokens). The user may use the credential management GUI 380 to remove and/or revoke credentials, in some aspects.

In general, once the user has obtained a signed credential and that signed credential is stored in the user's digital wallet (e.g., the digital wallet 104 of FIG. 1), the user may use the credential as proof in other scenarios. For example, as depicted in FIG. 4A, the user may use their proof-of-insurance credential with a rental car company to provide proof of insurance and, in some aspects, to receive a benefit in exchange (e.g., a discount, upgrade or other incentive).

Exemplary Decentralized Identity Checkout Aspect

Figure 4A:
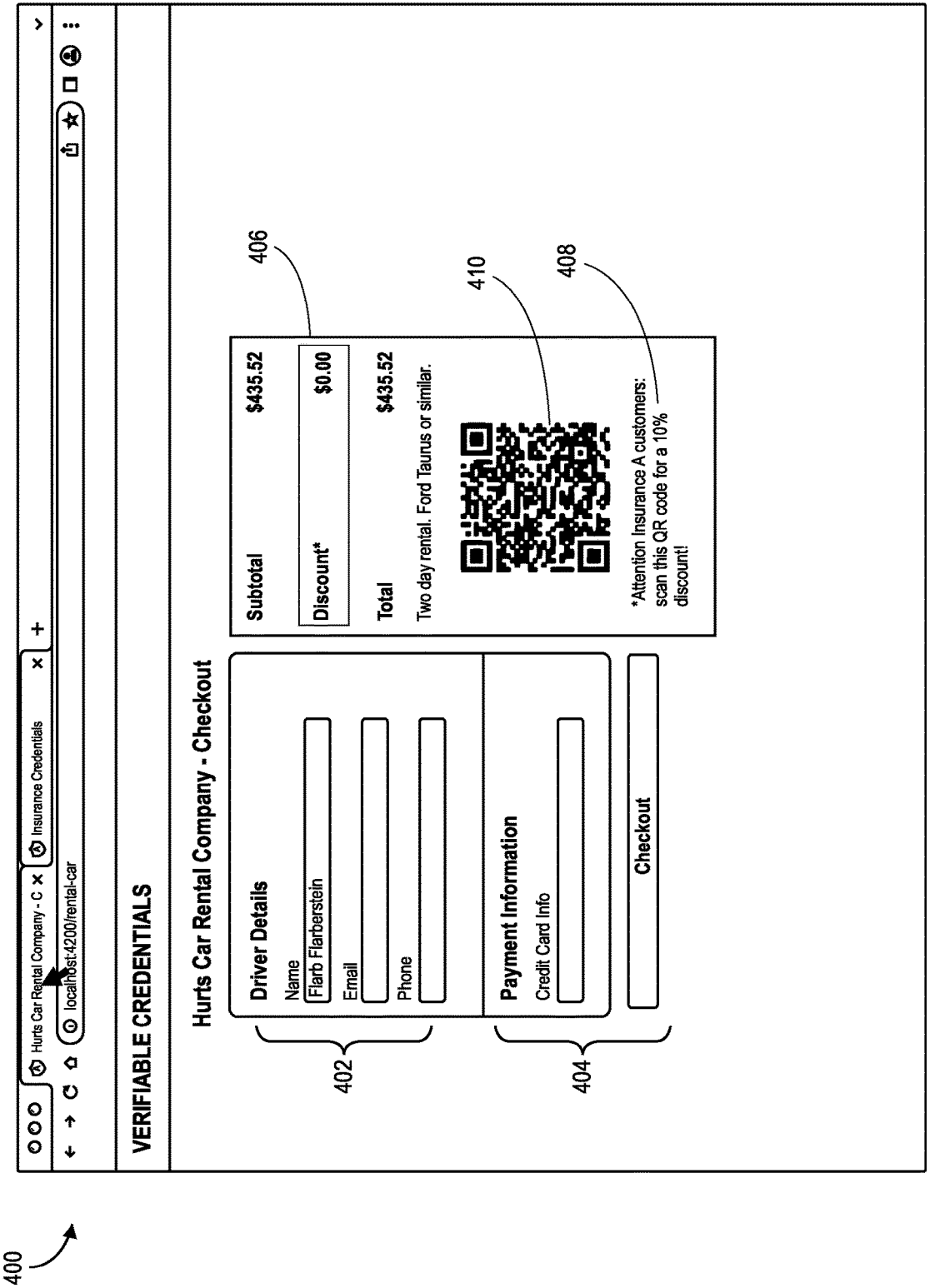
FIG. 4A depicts an exemplary decentralized identity (DID) checkout GUI, according to some aspects.

FIG. 4A depicts an exemplary DID checkout GUI 400, according to some aspects. The DID checkout GUI 400 may be displayed as part of a user's purchase of a service or good, such as a vehicle rental, in some aspects. For example, the DID checkout GUI 400 may be an interstitial web page displayed by a web server of a vehicle rental corporation (i.e., the service provider 112 of FIG. 1) during a vehicle rental checkout flow, viewed by the user via a mobile device (e.g., the mobile device 102).

The DID checkout GUI 400 may include a driver details element 402, a payment information element 404 and a subtotal element 406. The subtotal element 406 may include information about the vehicle rental that the user is in the process of ordering, including a discount prompt 408 and a QR code 410. As with the QR code 202 of FIG. 2, any suitable code type may be used, in some aspects. At the point in time depicted in FIG. 4A, the user may have only entered their name (i.e., Flarb Flaberstein) and no other information. Therefore, the car rental company may still need to acquire several pieces of information (i.e., proof of the user's identity, proof of insurance and payment information) prior to allowing the user to proceed with the vehicle rental reservation.

Next, the user may scan the QR code 410 using the user's mobile device. The mobile device may include instructions (e.g., in the application 116 of FIG. 1) that process the QR code and extract information. The extracted information my include a URI that the user may visit, such as a URI to an API endpoint in a web server of the services provider 112. The process of visiting the URI may be referred to as a verification request, wherein the user is requesting verification. The URI may encode (e.g., as GET or POST parameters) information about the user, such as the user's name and a session identifier (e.g., identifying the in-progress vehicle rental in the example of FIG. 4A). The services provider 112 may process the encoded information, and generate a proof request. The services provider 112 may transmit the proof request to the mobile device of the user. The mobile device of the user may include instructions (e.g., in the application 116) for processing and displaying the proof request to the user, as depicted in FIG. 4B.

Figure 4B:
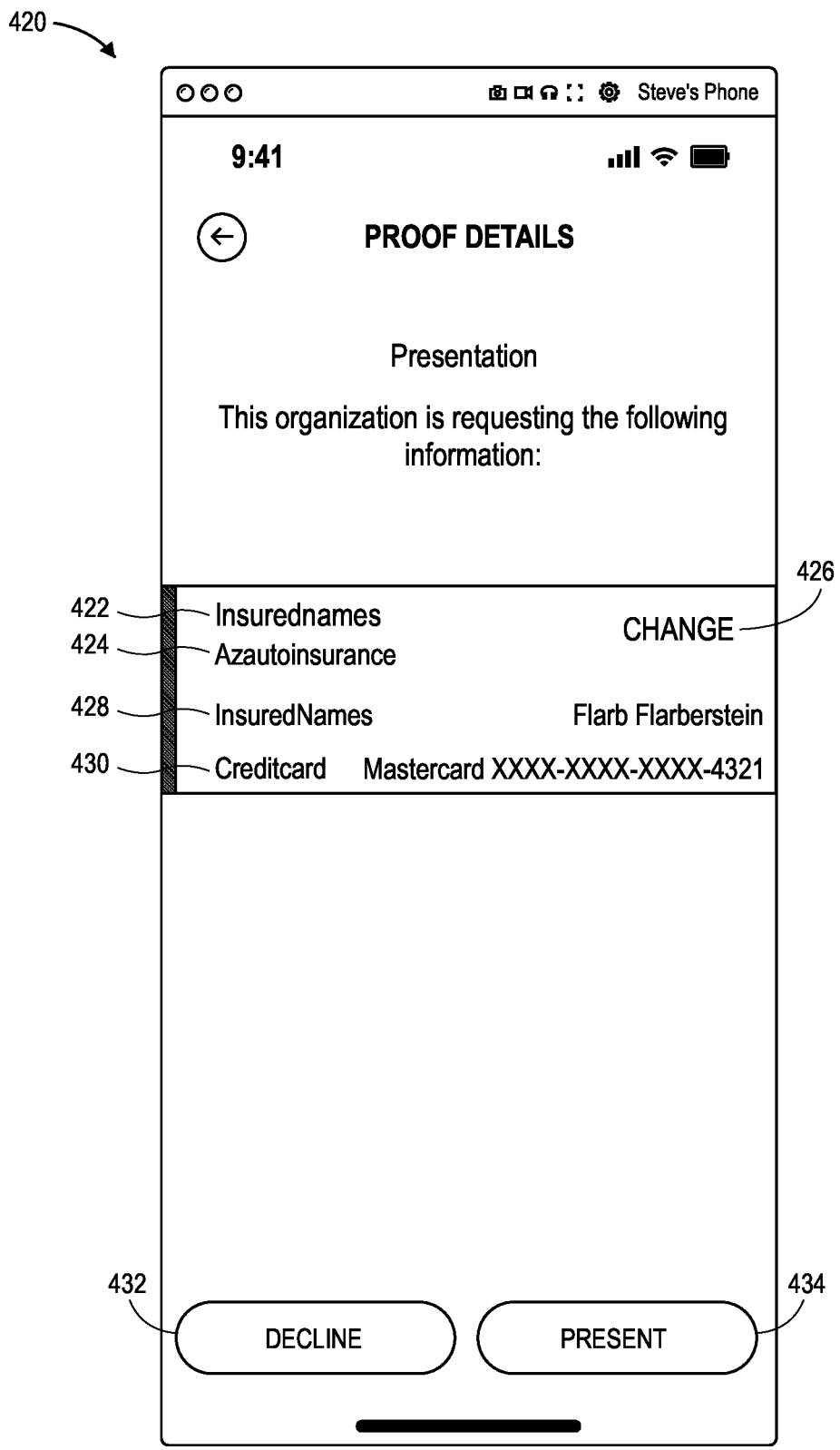
FIG. 4B depicts an exemplary credential proof request GUI, according to some aspects.

FIG. 4B depicts an exemplary credential proof request GUI 420, according to some aspects. The proof request of the services provider 112 may proof parameters (e.g., insurer proof, identity proof and/or payment proof), in some aspects. The credential proof request GUI 420 may process the proof request parameters and retrieve corresponding credentials (e.g., from the credentials database 130 of FIG. 1) based upon the requested information. The credential proof request GUI 420 may display to the user that those credentials are being requested, as shown in FIG. 4B.

For example, the credential proof request GUI 420 may display an insurer credential 422 that enables the user to present proof of an insurance policy credential 424 with an insurer. The credential proof request GUI 420 may include a selection field 426 that enables the user to select a different credential (e.g., a signed credential of a different vehicle insurer, in the case where the user has multiple insurance policies). The credential proof request GUI 420 may include an identity credential 428 that enables the user to present proof of identity, as well as a payment credential 430. The user may be able to select from different identities and/or payment methods, in some aspects. As discussed above, there may be context-specific scenarios in which the user may want to prove different credentials, for example when booking a vehicle reservation for a work trip, as opposed to a personal trip.

By selecting a decline credentials element 432 or a present credentials element 434 that are part of the credential proof request GUI 420, the user may, respectively, choose to decline to provide the requested credentials, or present the requested credentials. The credential proof request GUI 420 may include instructions that the requested credentials to be transmitted to the service provider when the user selects the present credentials element 434. Specifically, with reference to FIG. 1, instructions in the application 116 may cause one or more cryptographic keys contained within the credentials database 130 and/or other private data to be transmitted to the service provider 112. The service provider 112 may then verify the signature of each respective key. In some aspects, the elements of FIG. 1 may be arranged differently. For example, there may be cases in which the service provider 112 transmits a signature verification request to the mobile computing device 102. The mobile computing device 102 may sign the signature verification request, and transmit a response to the service provider 112 for verification. Those of ordinary skill in the art will appreciate that many different configurations of the elements of FIG. 1 are possible.

Figure 4C:
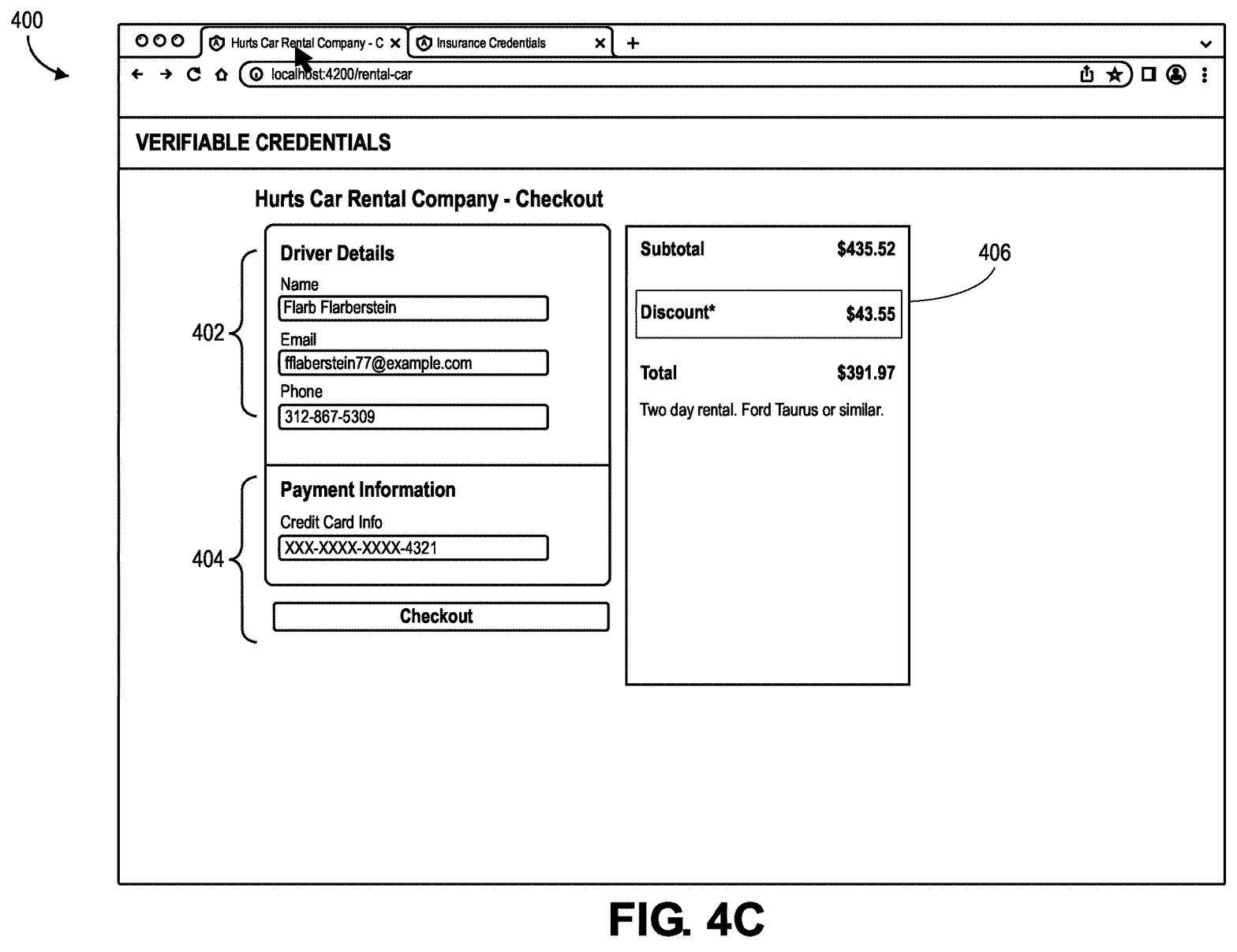

FIG. 4C depicts an example of an automatically completed DID checkout GUI 400, according to some aspects. The GUI 400 of FIG. 4C corresponds to the GUI 400 of FIG. 4A. Once the user selects the present credentials element 434, the service provider 112 may receive the requested credentials. The service provider 112 may process the provided credentials and automatically complete one or more fields of an electronic form related to the purchase of services or goods by filling in the one or more fields using values associated with the provided credentials.

For example, as depicted in FIG. 4C, the service provider 112 has received the requested credentials of the user including their proof of identity, proof of insurance and proof of insurance. The service provider 112 has updated the driver details element 402 to include the user's name, email address and telephone number, all of which were verified by cryptographic signature. The service provider 112 has updated the payment information element, also verified by cryptographic signature. In view of the user's having provided proof of insurance—which the service provider 112 verified via cryptographic signature—the service provider 112 has applied a discount to the subtotal element 406.

The user may then complete the vehicle rental by selecting a "complete reservation" or similar GUI element (not depicted). In response to the user's selection, the DID checkout GUI 400 may cause the pre-filled electronic form to be submitted to the service provider. It is important to note that in the depicted example, the user has completed a vehicle rental checkout with the vehicle rental company, and in the process proven the user's insurance information, identity and payment information—all without ever resorting to paper documentation of any kind. Further, advantageously, the user was able to accomplish this in an entirely digital manner, without the need to be in the physical presence of an employee of the vehicle rental company, for example, as would be required in a conventional checkout situation wherein a physical identification card would need to be presented.

In the examples shown in FIGS. 3A-4C, a number of important advantages of the present techniques are apparent. First, the present techniques enable a seamless way for users to obtain and store cryptographically-guaranteed credentials in portable and convenient manner, that does not rely on any third party for storage or recordkeeping. Second, the user may be able to exercise complete control over those credentials (e.g., via password-based authentication via the user's mobile device, via biometric-based authentication of the mobile device, etc.), leading to more self-sovereignty and personal choice. Third, the user is able to decide when to selectively present such credentials to others, in order to quickly and easily prove identity using cryptographic signatures, without the need to repeatedly prove credentials.

Further, the user's selectivity extends to the granularity of the information provided. For example, the user may verify their age, in some aspects, without revealing other identifying information. In many cases, the user is able to provide such cryptographic proof without the need to carry or present any physical documentation. Overall, the present techniques result in a much more seamless, convenient and less error-prone means for credential storage, presentation and verification. There are many other useful applications of decentralized identification techniques, as will be discussed further below.

Exemplary Cryptographically-Verifiable Property Transfer

Figure 5A:
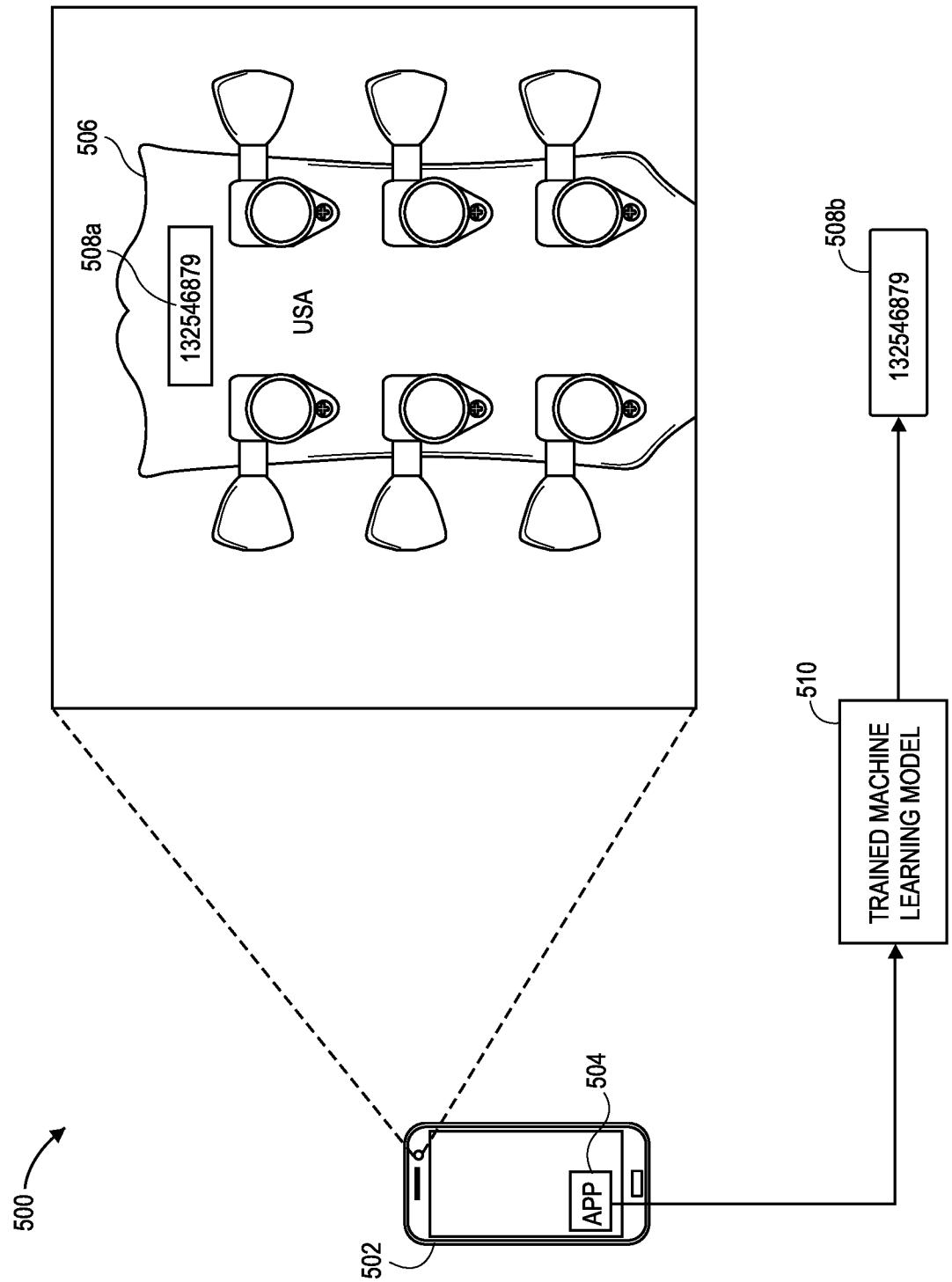
FIG. 5A depicts an exemplary computing environment for performing cryptographically-verifiable property transfer, according to some aspects.

The present techniques may include using a digital wallet (e.g., the digital wallet 104 of FIG. 1) to facilitate the transfer of goods from one person to another, for example during the distribution of assets in an estate. A user (i.e., testator) may use the digital wallet to create one or more cryptographically-signed bequests of property (e.g., real property, personal property, etc.). For example, FIG. 5A depicts an exemplary computing environment 500 for performing cryptographically-verifiable property transfer, according to some aspects.

The computing environment 500 may include a mobile device 502 including computer-executable instructions stored in one or more non-transitory memories. The mobile application 504 may include instructions for capturing an image of an article of personal property 506 via a camera device of the mobile computing device 502. In some aspects, such as the one depicted in FIG. 5A, the personal property 506 may include a personal property identifier 508a (e.g., a serial number, bar code, alpha-numeric string, etc.). The mobile application 504 may include computer-executable instructions for extracting a digital identifier 508b, in some aspects. In certain aspects, the present techniques may include processing the digital image of the property 506 using a machine learning model 510 trained using a training data set of one or more labeled images to extract the digital identifier 508b. For instance, each of the images in the training data set may be labeled with a respective property identifier (e.g., serial number, alphanumeric string, bar code, etc.).

In some aspects, the article of personal property may lack a personal property identifier 508a (i.e., may lack a serial number or other unique identifier). In such cases, the mobile application 504 may include instructions for generating a unique identifier, that may be based upon the image captured and/or image metadata (e.g., the user's location, date, time, etc.), and used in place of the personal property identifier 508a. In the case of real property, a generated digital identifier may be used, in some aspects. In some aspects, a street address or other identifier may be used (e.g., a parcel identifier, a tax identifier, a property description, etc.). In such aspects, the real property may not be identified using a photograph captured by the user. In some aspects, obtaining an identifier of the real property may include querying a publicly-available database, such as government real property database.

Figure 5B:
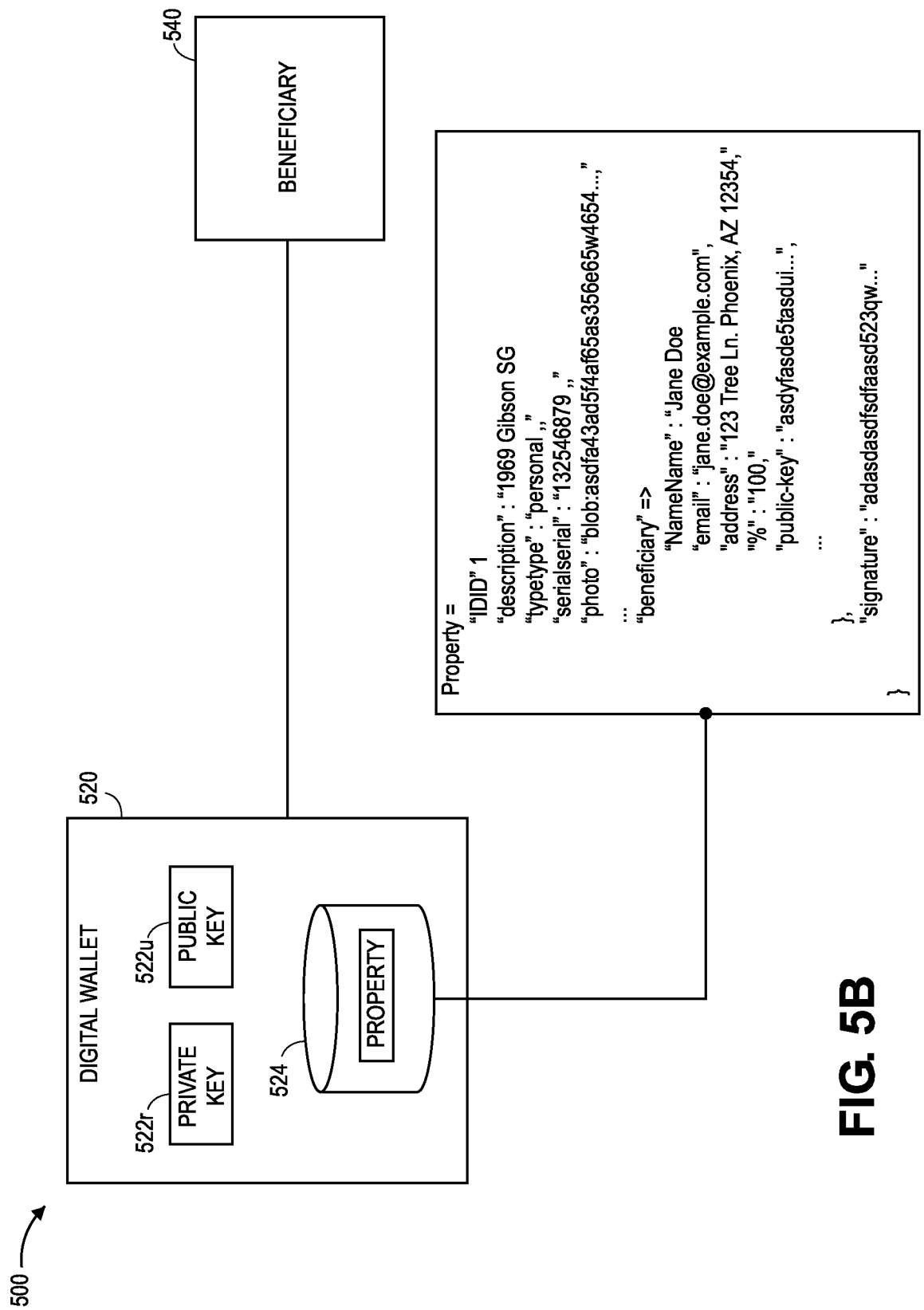
FIG. 5B depicts a digital wallet in which are stored a private key and a public key, according to some aspects.

In certain aspects, the mobile application 504 may include instructions that allow the user to add the personal property 506 along with additional information to the user's digital wallet. For example, FIG. 5B depicts a digital wallet 520 in which are stored a private key 522r and a public key 522u of the user. The digital wallet 520 may correspond to the digital wallet 104 of FIG. 1, in some aspects. The digital wallet 520 may further include a property database 524 including one or more items of property added by the testator-user. The environment 500 may further include a beneficiary 540, who may be a beneficiary selected by the testator to receive one or more testamentary items.

The property database 524 may include one or more electronic records, each corresponding to an item of property (real or personal) added by the testator. Each item added may be either selected or unselected, referring to whether the user-testator has assigned a beneficiary for that respective item. Returning to the example of FIG. 5A, the user has scanned a photo of an item of personal property that is a guitar. An "add item" GUI may be displayed (not depicted) that enables the user to add additional detail, including the photograph captured and the digital representation 508b, along with other descriptors (e.g., "1969 Gibson SG"). Of course, other serialized items of personal property may be bequeathed using the present techniques. This GUI may also enable the user to select one or more beneficiaries for the property, on a percentage basis, and may allow the user to add contact information for each of the beneficiaries.

For example FIG. 5B depicts a property record 530 having an ID of 1. This property record corresponds to the guitar personal property 506 of FIG. 5A, and may include a type of property, the extracted digital identifier 508b and a binary representation of the photograph captured by the mobile device 502. Further, this property record 530 may include beneficiary information 532. The beneficiary information shows the beneficiary information added by the user, as the person to whom the testator intends the property corresponding to the property record 530 to be bestowed.

Further, the property record 530 may include signature data 534, indicating that the property record 530 has been cryptographically signed. For example, the testator-user may select a GUI element in the application 504 that enables the cryptographic signature to be generated using the user's private key 522r and public key 522u once having added the property record 530 to the property database 524 and having selected a beneficiary. In some aspects, the testator-user may share the signed property record, and publish their public key 522u. In this way, before or after the testator-user's death, anyone in possession of the public key 522u may use it to determine whether the property record 530 may include a valid signature of the testator-user, and in so doing, determine whether the testator-user did, in fact, intend to bequeath the corresponding item of property to the named beneficiary.

For example, in some aspects, the testator-user may select a graphical user interface "notify beneficiary" element (not depicted). In response to the user's selection, instructions stored in the mobile computing device 502 may cause a message including the cryptographically-signed credential to be transmitted to the beneficiary (e.g., via email, text message, etc.), thereby notifying the beneficiary that they are the beneficiary of the bequeathed item, and providing a verifiable signature. In some aspects, this notification may be sent automatically in response to a condition, such as one determined by a blockchain smart contract.

Exemplary Distributed Computing Aspects

As will be appreciated by those of ordinary skill in the art, the present techniques may be used in conjunction with distributed computing infrastructures, including but not limited to distributed public or private ledgers (e.g., blockchain), peer-to-peer networks (e.g., bittorrent), databases, etc. For example, a distributed ledger may be used to store the user's public key (e.g., the public key 120u of FIG. 1). A private ledger may be used to publish and disseminate signed credentials (e.g., the authority application 108 of FIG. 1). Many such variations are envisioned.

Exemplary Computer-Implemented Methods

Figure 6A:
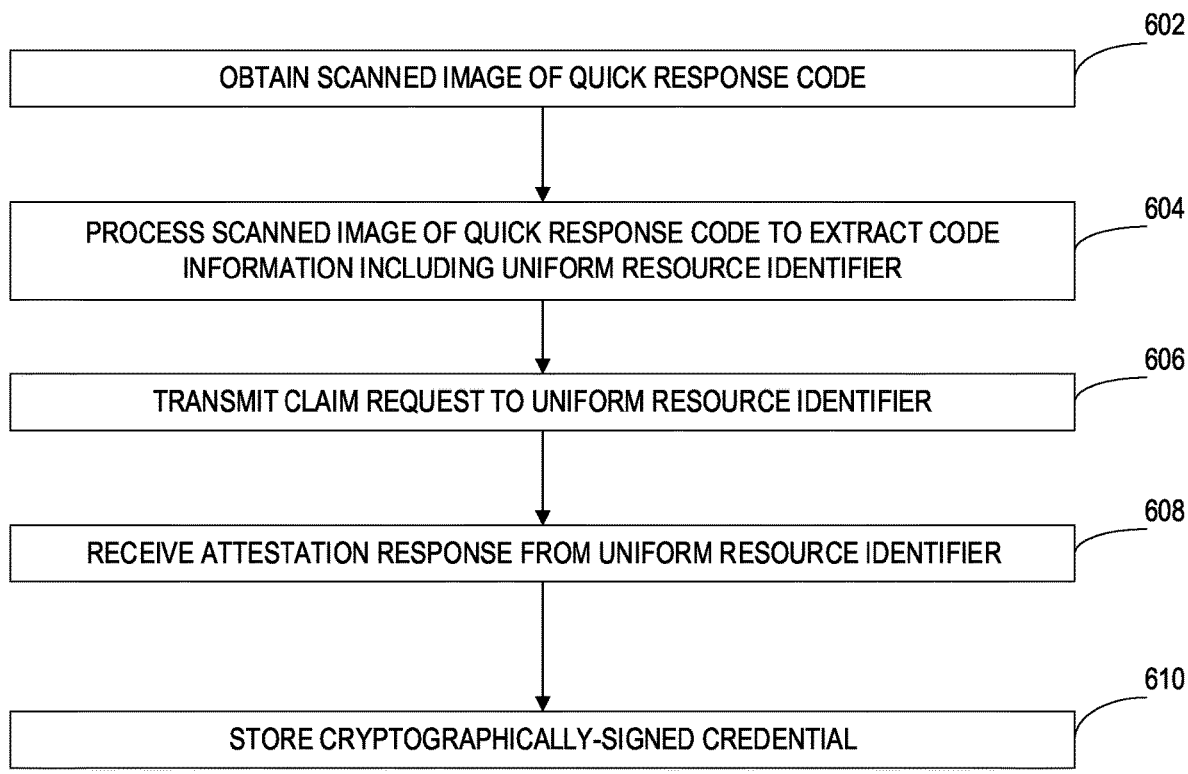
FIG. 6A depicts an exemplary computer-implemented method for obtaining a cryptographically-signed credential, according to some aspects.

FIG. 6A depicts an exemplary computer-implemented method 600 for obtaining a cryptographically-signed credential, according to some aspects. In general, the method 600 may be performed when one or more processors of the mobile computing device 102 of FIG. 1 execute instructions included in the memory of the mobile computing device 102 (e.g., the application 116).

In some aspects, the method 600 may include obtaining, in response to a user scan action with respect to a graphical user interface scan element displayed on a mobile computing device, via a camera device of the mobile computing device, a scanned image of a quick response code (block 602). For example, as discussed with respect to FIG. 1 and FIG. 2, the user may scan a QR code displayed on a web site with which the user is authenticated (e.g., an insurer's web site), wherein the QR code is generated and displayed by the insurer alongside proof of insurance description information describing the information to which the QR code refers. The insurer's web site may be displayed in a web server of the owner of the authority application 108, for example, or in another web server. The user's scan of the QR code may be facilitated by the GUI 300, as discussed above.

In some aspects, the method 600 may include processing the scanned image of the quick response code to extract code information including a uniform resource identifier (block 604). For example, processing the scanned image of the quick response code to extract code information including a uniform resource identifier may include establishing one or more DID Communication Protocols. Specifically, processing the QR code may include extracting a URI and other identifying information, such as that shown in the proof of insurance information 210. The processing may include displaying a menu to the user, including the URI. The menu may include instructions that, when executed, cause a user's action with respect to the menu to navigate a web browser of the mobile computing device 102 to the URI.

Specifically, in some aspects, the method 600 may include transmitting a claim request to the uniform resource identifier, the claim request including at least a cryptographic key of the user and security data (block 606). The claim request may be transmitted automatically upon scanning, and/or in response to the user's acting on a user interface element (e.g., the aforementioned menu), in certain aspects. In some aspects, the claim request may be a DID Communication request to the issuer's Software Agent.

In some aspects, the method 600 may include receiving an attestation response from the uniform resource identifier including at least the cryptographically-signed credential (block 608). For example, the cryptographically-signed credential may be received from the issuer's Software Agent. The attestation response may include a pending credential offer as depicted in FIG. 3B. The attestation response may include a credential of an insurer, such as the depicted "Azautoinsurance." Policy and vehicle information may be included and displayed on a GUI (e.g., the GUI 350) as depicted in FIG. 3B at this step.

In some aspects, the method 600 may include storing, in response to a user accept action with respect to a graphical user interface accept element displayed on the mobile computing device, the cryptographically-signed credential in an electronic database of a digital wallet application in a memory of the mobile computing device (block 610). For example, when the user taps or clicks the "Accept" button 360 of FIG. 3B, the credential may be stored in the credentials database 130 of FIG. 1. Henceforth, the user may selectively provide the signed credential (in this case, proof-of-insurance) upon request. The user may also delete the credential from the user's digital wallet (e.g., the digital wallet 104 of FIG. 1).

In some aspects, the computer implemented method 600 may include transmitting a verification request to a service provider and receiving in response to the transmitting a credential proof request from the service provider, wherein the credential proof request includes one or more credential proof parameters. In some aspects the method 600 may include displaying approved request graphical user interface including the one or more credential proof parameters. In some aspects, the method 600 may further include transmitting in response to a user's present credentials action with respect to a graphical user interface present credentials element one or more credentials of the user to the service provider the one or more credentials corresponding to the one or more credential proof request parameters.

FIG. 4B depicts an example of a credential proof request. In the example, the proof request is transmitted to a user and requests that the user supply proof of insurance. The parameters include the name of the insured, the name of the auto insurance company, billing information etc. More or fewer parameters may be included and some aspects, and different parameters may be included and some aspects.

Corresponding credentials may include actual values corresponding to the requested parameters. For example, if a requested parameter is insured name, then the corresponding credential may be the name Flarb Flarberstein, corresponding to the name of the user of the GUI 420. Once the user decides to present their credentials in response to the credential proof request, for example by pressing the present graphical user interface element 434, the method may include transmitting the user's credentials to the service provider. For example, the user's credentials maybe retrieved from the credentials data store 130 and transmitted via the electronic network 110 to the service provider 112, in the context of computing environment 100 of FIG. 1.

In some aspects the method 600 may further include receiving an electronic form including at least one field including values corresponding to the credential proof parameters and causing, in response to receiving a user submission of the electronic form, the electronic form to be transmitted to the service provider to complete a decentralized identity checkout process. For example, FIG. 4C depicts an example of a rental car checkout graphical user interface in which an electronic form includes credential proof parameters such as driver details and payment information. When the user selects a checkout button that is part of the graphical user interface, the form may be transmitted for example via an HTTP request to a service provider to complete a decentralized identity checkout process. The process is decentralized in the sense that the user's credentials were stored by the user, and not a third party, for example on the user's local device such as the client computing device 102.

As discussed elsewhere, enabling the user to store credentials in a digital wallet such as the digital wallet 104 advantageously provides the user with greater autonomy and to control over the user's identity, increasing the users sense of security and reducing the attack surface for bad actors. Specifically, no one actor can hack a database and access thousands or millions of subscribers' information when credentials are distributed in the manner described.

In some aspects the cryptographically signed credential of the method 600 is a proof of insurance credential. This proof of insurance credential maybe a vehicle proof of insurance credential or a homeowner's proof of insurance credential or a motorcycle proof of insurance credential or a nautical craft proof of insurance credential or any other suitable type of proof of insurance credential. The proof of insurance credential may include insurance description information such as a policy number, a named insured, a policy affective date, a policy expiration date, a vehicle identification number, a vehicle make, a vehicle year, etc. In some aspects the proof of insurance credential may include further information or less information, such as a policy number, a named insured, a policy effective date, a policy expiration date, a coverage limit, a liability limit, a deductible, and or a policy premium.

The cryptographic key of the method 600 may be a public key, a private key, and or a public/private key pair. The method 600 may include additional security data such as a session cookie identifying an authenticated web session of the user. The service provider may use the security data as depicted in FIG. 1 reference 140 to positively identify the user by verifying cryptographic signatures generated by the user's public and private key, and may also enforce its own security policies using the session cookie information or other private data of the service provider.

In practice, the QR code may correspond to any suitable entity/resource. For example, to continue the example of an insurance credential, a third-party cloud-based agent (e.g., a Software Agent) may act on behalf of the two parties exchanging DID documents over a DID communication protocol. For example, the environment 100 of FIG. 1 may include a separate software agent (not depicted) that is a cloud-based software agent accessible via the network 110. This software agent may be a third-party agent or a software agent owned/controlled by the issuer. The software agent may act on behalf of the issuer (e.g., the insurance company), the service provider (e.g., the rental car company), and/or other parties. In the example of FIG. 4A, the software agent is a mobile agent/wallet including software instructions for processing DID messaging protocols.

The procedure for the issuer to issue the credential to the user/client may require the issuer to know and trust the user. This trust may be established in a number of ways. For example, in a first aspect, the user (e.g., a policy holder) authenticates to the issuer's website (e.g., an insurance company website) using conventional methods (e.g., password login). This login process establishes trust between the policy holder and the insurance company in that moment. The issuer may add additional layers of authentication at their discretion (e.g., password coupled with multi-factor authentication, biometric authentication, etc.). Further, when the issuer is an insurer, for example, the issuer may have personally-identifiable information of the user that can be used as a further authentication factor, such as a driver's license number. The issuer can use this information to request a DID verification of the user's driver's license credential, and compare it to the driver's license on file to establish trust. Once trust is established, the issuer can offer a credential to the user (e.g., policy holder). This may include generating an out-of-band message, in reference to the DIDComm Messaging Editor's draft, available online at https://identity.foundation/didcomm-messaging/spec/v2.1 and hereby incorporated by reference in its entirety for all purposes.

The out-of-band message may be presented in the form of the QR code, URL, etc. and can be layered on top of other software agents that understand DIDComm. The out-of-band message is designed as an invitation to communicate, and may include sender's DIDPart of the out-of-band message as a goal, in this example the goal is to issue an insurance credential. As a result, the user's agent (e.g., the policy holder's wallet) will now have the issuer's DID, which can and should be verified by the agent. The user's agent (wallet) can then initiate a peer-to-peer communication protocol requesting the credential.

Figure 6B:
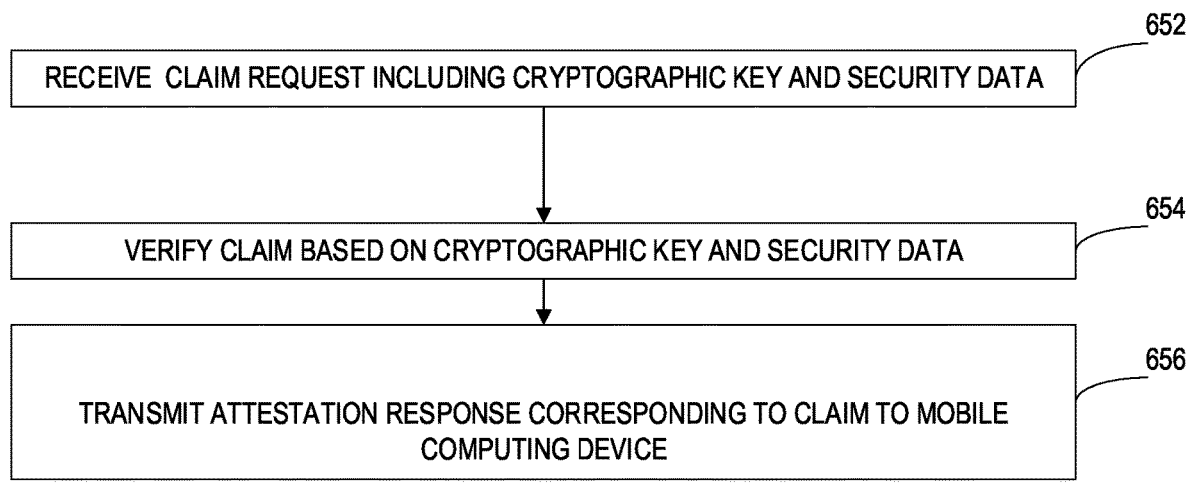
FIG. 6B depicts an exemplary computer-implemented method for providing a cryptographically-signed credential, according to some aspects.

FIG. 6B depicts an exemplary computer-implemented method 650 for providing a cryptographically-signed credential. In general, the method 650 may be performed when one or more processors of the remote computing device 106 execute instructions included in the memory of the remote computing device 106 (e.g., the authority application 108).

In some aspects, the method 650 may include receiving a claim request via a uniform resource identifier from a mobile computing device, the claim request including at least a cryptographic key of a user and security data (block 652). The claim request may correspond to the claim request transmitted by the mobile computing device 102 in the method 600, in some aspects.

In some aspects, the method 650 may include verifying the claim based upon the cryptographic key and security data (block 654). The authority application 108 may include cryptographic signature verification routines (e.g., OpenSSL, GNUPG, etc.) that enable the authority application 108 to import public keys and to sign/validate signatures of signed files/data, as will be appreciated by those of ordinary skill in the art. Likewise, the mobile computing device 102 may include similar routines for generating public and private keys and for signing and verifying the signatures of data/files. The method 650 may include verifying a proprietary authentication status, such as the presence of a valid cookie in the claim request.

For example, the authority application 108 may check the database 140 to determine whether the user's submitted security data (e.g., the security data 140) includes a valid session cookie. It will be appreciated by those of ordinary skill in the art that in some cases, the authority application 108 may reject/deny a user's claim request even in the presence of a valid public key (e.g., when the user's security data 140 does not include additional validating tokens) or when the user is properly logged in (i.e., has a valid session cookie) but submits an invalid or improperly formed public key, or one belonging to another person. Further, as discussed herein, the security data may sometimes include material that is only reviewable by a human (e.g., a scan of the user's birth certificate, in some aspects). In such cases, the user's claim request may be deferred for later asynchronous processing.

In some aspects, the method 650 may include transmitting an attestation response corresponding to the claim to the mobile computing device (block 656). The attestation response may include an indication of approval or denial of the user's claim request. For example, when the user submits a valid public key and session cookie, the authority application 108 may respond with an approval attestation response, including a cryptographic signature of the insurer, that the user can henceforth use to prove that their insurance is valid. The cryptographic signature may be revocable, and may have a predetermined expiration date.

In some aspects the method 650 may include receiving a verification request from the mobile computing device, determining a set of credential proof parameters required to verify the verification request, transmitting a credential proof request to the mobile computing device wherein the credential proof request includes the one or more credential proof parameters, and receiving one or more credentials of the user that correspond to the one or more credential proof request parameters.

For example, the verification request maybe a request to verify the current status of the users automobile insurance policy. The verification request may be transmitted to the service provider in the course of checking out at retail a rental vehicle as depicted in FIG. 4A. The credential proof request may be generated in response to the user scanning a QR code such as the code 410 of FIG. 4A. The verification request may be received from the mobile computing device in a computer such as a server operated by the service provider, and some aspects. For example, when the verification request is for an automobile rental, the service provider may determine that the set of credential proof parameters required to verify the verification request are the proof of insurance of the vehicle owner. The service provider server may transmit a credential proof request to the mobile computing device wherein the credential proof request includes the one or more credential proof parameters.

The service provider's server may then receive credentials of the user corresponding to the credential proof request parameters. In some aspects the received credentials may include one or more cryptographic signatures corresponding to the user. The server may verify these cryptographic signatures for example using a cryptographic library to check whether the credential signatures are valid. When the cryptographic signature has been verified, the server of the service provider may generate an electronic form including at least one field filled in with values corresponding to the credential proof request parameters.

The form may then be transmitted by the server to the mobile computing device of the user. For example, the method 650 may correspond to FIGS. 4A, 4B and 4C.

In particular, FIG. 4C may correspond to the generated electronic form having the at least one field filled in with values corresponding to the credential proof request parameters. Specifically, the credential proof request parameters may be the driver details and payment information. The filled-in form may include information of a third party such as the vehicle rental company, as in reference 406 that includes a subtotal a discount and a total rental price.

It should be understood that the service provider discussed during the foregoing description of the method 650 may in some cases be the issuer of the credential, such as an insurance company when the credential corresponds to a proof of insurance credential. However, in some aspects, the method 650 may include two or more service providers. In that case a first service provider may perform the credential verification process, whereas a second service provider performs the credential request and/or one or more other steps.

The method 650 may include receiving a submission of the electronic form and processing the electronic form. For example, the rental car company may receive a submission of the rental car check out form including the user's verified credentials, and may process a payment for the rental using the electronic form as input.

In some aspects the method 650 may include receiving an electronic form that corresponds to a user's presentation of proof details. For example with respect to FIG. 4B, a vehicle rental company may request proof of insurance credentials from the user. The user may transmit the credentials via the electronic network and the service provider may receive the one or more credentials of the user, verify cryptographic signatures of the received credentials, and generate an electronic form including field values corresponding to the credential proof request parameters. The electronic form with values filled in may include values corresponding to the proof parameters.

In some aspects, the service provider may transmit a proof of insurance credential to the mobile computing device wherein the proof of insurance credential includes insurance description information, such as a policy number, a named insured, a policy effective date, a policy expiration date, a vehicle identification number, a vehicle make and/or a vehicle year.

Figure 7:
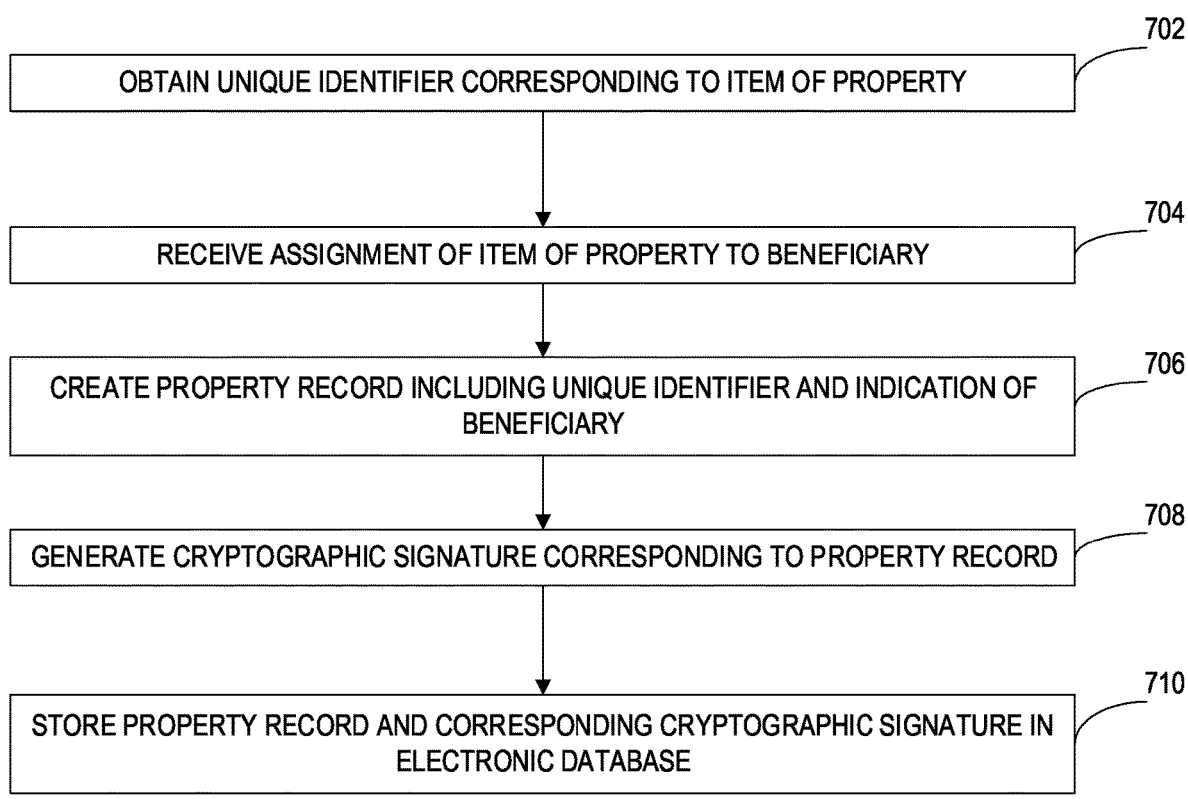
FIG. 7 depicts an exemplary computer-implemented method for performing cryptographically-verifiable property transfer, according to some aspects.

FIG. 7 depicts an exemplary computer-implemented method 700 for performing cryptographically-verifiable property transfer, according to some aspects. The method 700 may be performed by the mobile computing device 502 of FIG. 5A, in certain aspects.

In some aspects, the method 700 may include obtaining a unique identifier corresponding to an item of property of a testator-user (block 702). The unique identifier may correspond to a serial number, for example. The serial number may be obtained by a machine learning model processing an image captured by the user using the mobile computing device 102, in some aspects. In some aspects, the mobile computing device 102 may obtain the unique identifier by querying a public database (e.g., a database of county tax records) to obtain a public identifier (e.g., a parcel identifier) . FIG. 5A depicts the process whereby the unique identifier is obtained by processing an image using a trained machine learning model.

In some aspects, the method 700 may include receiving an assignment of the item of property to at least one beneficiary (block 704). The assignment of the item to a beneficiary may be performed by the user selecting the name of a beneficiary from a list or by the user entering the beneficiary's information. The beneficiary may correspond to the beneficiary 540 of FIG. 5B, in certain aspects.

In some aspects, the method 700 may include creating a property record including the unique identifier and an indication of the at least one beneficiary (block 706). The property record may be a row in a database, in some aspects.

In some aspects, the method 700 may include generating a cryptographic signature corresponding to the property record (block 708). As discussed herein, the cryptographic signature may be generated via known means. The cryptographic signature may be based upon the public key 522$u$ and private key 522$r$ of FIG. 5B, in certain aspects.

In some aspects, the method 700 may include storing the property record and the corresponding cryptographic signature in an electronic database (block 710). For example, the cryptographic signature may be stored in the property database 524 of FIG. 5B. FIG. 5B depicts a property record having an assigned beneficiary, and signature information.

In some aspects, the method 700 may include obtaining an image of the personal property from a camera device of a mobile computing device and processing the image of the personal property using a trained machine learning model to determine the unique identifier. For example, FIG. 5A depicts an item of personal property 506. The item of personal property includes a unique identifier in the form of a stamped serial number 508A. In the case of FIG. 5A the item of personal property is personal property. The image of the personal property may be captured by a camera of the mobile device 502. An app 504 contained within the mobile device 502 may include sets of computer executable instructions that when executed by a processor of the mobile device 502 cause the camera to capture the image.

The sets of instructions may include instructions for providing the captured input as a digital image to the trained machine learning model 510. The instructions may also include instructions for capturing and output 508 of the trained machine learning model 510, and storing that output 508 in the memory of the mobile computing device 502, and/or transmitting the output to another computing device via the network.

The trained machine learning model 510 may be trained using labeled images of articles of personal property. For example a model may be trained using the obverse side of six string guitar headstocks. In other examples a model may be trained using the obverse side of six string and twelve string guitar head stocks. In still further examples a model may be trained using all types of personal property including guitars but also other objects.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, the term "set" may include a collection of one or more elements.

In addition, use of "a" or "an" is employed to describe elements and components of the aspects herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for obtaining a cryptographically-signed credential, comprising:
   obtaining, in response to a user scan action of a user with respect to a graphical user interface scan element displayed on a mobile computing device, via a camera device of the mobile computing device, a scanned image of a quick response code;
   processing the scanned image of the quick response code to extract code information including a uniform resource identifier to establish a decentralized identifier (DID) protocol, wherein establishing the DID protocol includes determining the DID protocol from among a plurality of DID protocols based upon at least a portion of the uniform resource identifier;
   transmitting a DID communication request to a software agent of an issuing party according to the DID protocol, the DID communication request including at least a cryptographic key of the user and security data;
   receiving an attestation response from the software agent including at least the cryptographically-signed credential; and
   storing, in response to a user accept action with respect to a graphical user interface accept element displayed on the mobile computing device, the cryptographically-signed credential in an electronic database of a digital wallet application in a memory of the mobile computing device.

2. The computer-implemented method of claim 1, further comprising:
   transmitting a verification request to a service provider;
   receiving, in response to the transmitting, a credential proof request from the service provider, the credential proof request including one or more credential proof parameters;
   displaying a proof request graphical user interface including the one or more credential proof parameters; and
   transmitting, in response to a user present credentials action with respect to a graphical user interface present credentials element, one or more credentials of the user to the service provider, the one or more credentials corresponding to the one or more credential proof request parameters.

3. The computer-implemented method of claim 2, further comprising:
   receiving an electronic form including at least one field including values corresponding to the credential proof request parameters; and
   causing, in response to receiving a user submission of the electronic form, the electronic form to be transmitted to the service provider, to complete a decentralized identity checkout process.

4. The computer-implemented method of claim 1, wherein the cryptographically-signed credential is a proof-of-insurance credential.

5. The computer-implemented method of claim 4,
   wherein the proof-of-insurance credential is a vehicle proof-of-insurance credential, and
   wherein the vehicle proof-of-insurance credential includes insurance description information including at least a policy number, a named insured, a policy effective date, a policy expiration date, a vehicle identification number, a vehicle make and a vehicle year.

6. The computer-implemented method of claim 4,
   wherein the proof-of-insurance credential is a homeowners' proof-of-insurance credential, and
   wherein the homeowners' proof-of-insurance credential includes insurance description information including at least a policy number, a named insured, a policy effective date, a policy expiration date, a coverage limit, a liability limit, a deductible and a policy premium.

7. The computer-implemented method of claim 1,
   wherein the cryptographic key is a public key, and
   wherein the security data includes a session cookie identifying an authenticated web session of the user.

8. A computing system for obtaining a cryptographically-signed credential, comprising:
   one or more processors; and
   one or more memories having stored thereon computer-executable instructions that, when executed by the one or more processors, cause the computing system to:
      obtain, in response to a user scan action of a user with respect to a graphical user interface scan element displayed on a mobile computing device, via a camera device of the mobile computing device, a scanned image of a quick response code;
      process the scanned image of the quick response code to extract code information including a uniform resource identifier to establish a decentralized identifier (DID) protocol, wherein establishing the DID protocol includes determining the DID protocol from among a plurality of DID protocols based upon at least a portion of the uniform resource identifier;
      transmit a DID communication request to a software agent of an issuing party according to the DID protocol, the DID communication request including at least a cryptographic key of the user and security data;
      receive an attestation response from the software agent including at least the cryptographically-signed credential; and
      store, in response to a user accept action with respect to a graphical user interface accept element displayed on the mobile computing device, the cryptographically-signed credential in an electronic database of a digital wallet application in a memory of the mobile computing device.

9. The computing system of claim 8, the memories having stored thereon further instructions that, when executed by the one or more processors, cause the computing system to:
   transmit a verification request to a service provider;
   receive, in response to the transmitting, a credential proof request from the service provider, the credential proof request including one or more credential proof parameters;
   display a proof request graphical user interface including the one or more credential proof parameters; and
   transmit, in response to a user present credentials action with respect to a graphical user interface present credentials element, one or more credentials of the user to the service provider, the one or more credentials corresponding to the one or more credential proof parameters.

10. The computing system of claim 9, the memories having stored thereon further instructions that, when executed by the one or more processors, cause the computing system to:

receive an electronic form including at least one field including values corresponding to the credential proof parameters; and cause, in response to receiving a user submission of the electronic form, the electronic form to be transmitted to the service provider, to complete a decentralized identity checkout process.

11. The computing system of claim 8, wherein the cryptographically-signed credential is a proof-of-insurance credential.

12. The computing system of claim 11,
wherein the proof-of-insurance credential is a vehicle proof-of-insurance credential, and
wherein the vehicle proof-of-insurance credential includes insurance description information including at least a policy number, a named insured, a policy effective date, a policy expiration data, a vehicle identification number, a vehicle make and a vehicle year.

13. The computing system of claim 11,
wherein the proof-of-insurance credential is a homeowners' proof-of-insurance credential, and
wherein the homeowners' proof-of-insurance credential includes insurance description information including at least a policy number, a named insured, a policy effective date, a policy expiration date, a coverage limit, a liability limit, a deductible and a policy premium.

14. The computing system of claim 8,
wherein the cryptographic key is a public key, and
wherein the security data includes a session cookie identifying an authenticated web session of the user.

15. A non-transitory computer-readable medium having stored thereon computer-executable instructions, that when executed, cause a computer to:
obtain, in response to a user scan action of a user with respect to a graphical user interface scan element displayed on a mobile computing device, via a camera device of the mobile computing device, a scanned image of a quick response code;
process the scanned image of the quick response code to extract code information including a uniform resource identifier to establish a decentralized identifier (DID) protocol, wherein establishing the DID protocol includes determining the DID protocol from among a plurality of DID protocols based upon at least a portion of the uniform resource identifier;
transmit a DID communication request to a software agent of an issuing party according to the DID protocol, the DID communication request including at least a cryptographic key of the user and security data;
receive an attestation response from the software agent including at least one cryptographically-signed credential; and
store, in response to a user accept action with respect to a graphical user interface accept element displayed on the mobile computing device, the cryptographically-signed credential in an electronic database of a digital wallet application in a memory of the mobile computing device.

16. The non-transitory computer-readable medium of claim 15, having stored thereon further computer-executable instructions, that when executed, cause a computer to:
transmit a verification request to a service provider;
receive, in response to the transmitting, a credential proof request from the service provider, the credential proof request including one or more credential proof parameters;
display a proof request graphical user interface including the one or more credential proof parameters; and
transmit, in response to a user present credentials action with respect to a graphical user interface present credentials element, one or more credentials of the user to the service provider, the one or more credentials corresponding to the one or more credential proof parameters.

17. The non-transitory computer-readable medium of claim 16, having stored thereon further computer-executable instructions, that when executed, cause a computer to:
receive an electronic form including at least one field including values corresponding to the credential proof parameters; and
cause, in response to receiving a user submission of the electronic form, the electronic form to be transmitted to the service provider, to complete a decentralized identity checkout process.

18. The non-transitory computer-readable medium of claim 15, wherein the cryptographically-signed credential is a proof-of-insurance credential.

19. The non-transitory computer-readable medium of claim 18,
wherein the proof-of-insurance credential is a vehicle proof-of-insurance credential, and
wherein the vehicle proof-of-insurance credential includes insurance description information including at least a policy number, a named insured, a policy effective date, a policy expiration data, a vehicle identification number, a vehicle make and a vehicle year.

20. The non-transitory computer-readable medium of claim 18,
wherein the proof-of-insurance credential is a homeowners' proof-of-insurance credential, and
wherein the homeowners' proof-of-insurance credential includes insurance description information including at least a policy number, a named insured, a policy effective date, a policy expiration date, a coverage limit, a liability limit, a deductible and a policy premium.

* * * * *